United States Patent
Takahagi et al.

(10) Patent No.: US 9,720,509 B2
(45) Date of Patent: Aug. 1, 2017

(54) GESTURE DETECTION SYSTEM, GESTURE DETECTION APPARATUS, AND MOBILE COMMUNICATION TERMINAL

(71) Applicant: Moff, Inc., Tokyo (JP)

(72) Inventors: Akinori Takahagi, Tokyo (JP); Motohiro Yonesaka, Kanagawa (JP)

(73) Assignee: Moff, Inc., Tokyo (JP)

( * ) Notice: Subject to any disclaimer, the term of this patent is extended or adjusted under 35 U.S.C. 154(b) by 93 days.

(21) Appl. No.: 14/526,737

(22) Filed: Oct. 29, 2014

(65) Prior Publication Data

US 2015/0123897 A1 May 7, 2015

(30) Foreign Application Priority Data

Nov. 5, 2013 (JP) .................................. 2013-229032
Oct. 7, 2014 (JP) .................................. 2014-206748

(51) Int. Cl.
*G06F 3/01* (2006.01)
*A63H 30/04* (2006.01)
*G06F 3/0346* (2013.01)

(52) U.S. Cl.
CPC .............. *G06F 3/017* (2013.01); *A63H 30/04* (2013.01); *G06F 3/0346* (2013.01)

(58) Field of Classification Search
CPC ....... G10H 2220/321; G10H 2220/326; G10H 2220/331; G10H 2220/336;
(Continued)

(56) References Cited

U.S. PATENT DOCUMENTS 5,260,510 A * 11/1993 Shibukawa ............... G10H 1/38
  84/637
6,150,947 A * 11/2000 Shima ....................... A63H 5/00
  340/692

(Continued)

FOREIGN PATENT DOCUMENTS

| JP | 2007-300980 | 11/2007 |
| JP | 2012-103840 | 5/2012 |
| JP | 2012-155616 | 8/2012 |

OTHER PUBLICATIONS

C.S. Myers and L.R. Rabiner, "A Comparative Study of Several Dynamic Time-Warping Algorithms for Connected-Word Recognition", The Bell System Technical Journal, vol. 60, No. 7, Sep. 1981.

(Continued)

*Primary Examiner* — Benjamin C Lee
*Assistant Examiner* — Dong Hui Liang
(74) *Attorney, Agent, or Firm* — IPUSA, PLLC

(57) ABSTRACT

A gesture detection system having a gesture detection apparatus to detect a gesture of a user, and a mobile communication terminal that can communicate with the gesture detection apparatus, includes a storage unit to store first gesture data defining the gesture of the user, and audio or visual data associated with the first gesture data; an obtainment unit to obtain second gesture data representing the gesture of the user; a transmission unit to transmit the second gesture data to the mobile communication terminal; a determination unit to determine whether the gesture defined by the first gesture data is the same as the gesture represented by the second gesture data; a selection unit to select the audio or visual data associated with the first gesture data depending on the determination result; and an output unit to output the audio or visual data.

9 Claims, 38 Drawing Sheets

(58) Field of Classification Search
CPC ....... G10H 2220/201; G10H 2220/395; G10H 2230/251; G10H 2230/275; G10H 2230/281; G10H 2230/285; G10H 2230/295; G10H 2230/301; G10H 2230/305; G06F 1/163; G06F 3/017
See application file for complete search history.

(56) References Cited

U.S. PATENT DOCUMENTS

| | | | | |
|---|---|---|---|---|
| 8,759,659 | B2* | 6/2014 | Tabata | G10H 1/0008 84/615 |
| 2004/0094613 | A1* | 5/2004 | Shiratori | A61B 5/1118 235/105 |
| 2005/0212767 | A1* | 9/2005 | Marvit | G06F 1/1626 345/158 |
| 2007/0028749 | A1* | 2/2007 | Basson | G10H 1/0091 84/601 |
| 2007/0139370 | A1* | 6/2007 | Lu | G06F 3/011 345/156 |
| 2008/0015017 | A1 | 1/2008 | Ashida et al. | |
| 2010/0009746 | A1* | 1/2010 | Raymond | A63F 13/22 463/31 |
| 2010/0124949 | A1* | 5/2010 | Demuynck | G06F 1/1626 455/569.1 |
| 2011/0163947 | A1* | 7/2011 | Shaw | G06F 3/0346 345/156 |
| 2011/0163955 | A1* | 7/2011 | Nasiri | A63F 13/06 345/158 |
| 2011/0199292 | A1* | 8/2011 | Kilbride | G06F 3/017 345/156 |
| 2012/0112995 | A1 | 5/2012 | Maeda | |
| 2014/0253487 | A1* | 9/2014 | Bezinge | G04G 17/045 345/173 |

OTHER PUBLICATIONS

"Dynamic time warping", Wikipedia, http://en.wikipedia.org/wiki/Dynamic_time_warping.

* cited by examiner

| REGISTERED WAVEFORM NUMBER | OUTPUT DATA |
|---|---|
| 1 | userdata_001.aac |
| 2 | preset_001.wav |
| 3 | preset_002.wav |

| CONDITION (THRESHOLD) | CONDITION (APPLICATION DATA) | OUTPUT DATA |
|---|---|---|
| X > THRESHOLD A | FLAG ON | drive.mp3 |
| X > THRESHOLD A | FLAG OFF | ignition.mp3 |
| X > THRESHOLD A AND Y > THRESHOLD B | FLAG ON | drift.mp3 |
| X > THRESHOLD A AND Y > THRESHOLD B AND Z > THRESHOLD C | FLAG ON | crash.mp3 |

FIG.10

| CONDITION (THRESHOLD) | CONDITION (APPLICATION DATA) | OUTPUT DATA |
|---|---|---|
| X > THRESHOLD A | NO HISTORY | preset_101.wav |
| X > THRESHOLD A AND Y > THRESHOLD B | NO HISTORY | preset_102.wav |
| X > THRESHOLD A AND Y > THRESHOLD B AND Z > THRESHOLD C | NO HISTORY | preset_103.wav |
| ⋮ | ⋮ | ⋮ |
| X > THRESHOLD A | preset_101.wav→ preset_102.wav→ preset_103.wav | preset_101.wav, preset_special.wav |
| X > THRESHOLD A AND Y > THRESHOLD B | preset_101.wav→ preset_102.wav→ preset_103.wav | preset_102.wav, preset_special.wav |
| X > THRESHOLD A AND Y > THRESHOLD B AND Z > THRESHOLD C | preset_101.wav→ preset_102.wav→ preset_103.wav | preset_103.wav, preset_special.wav |

231-3

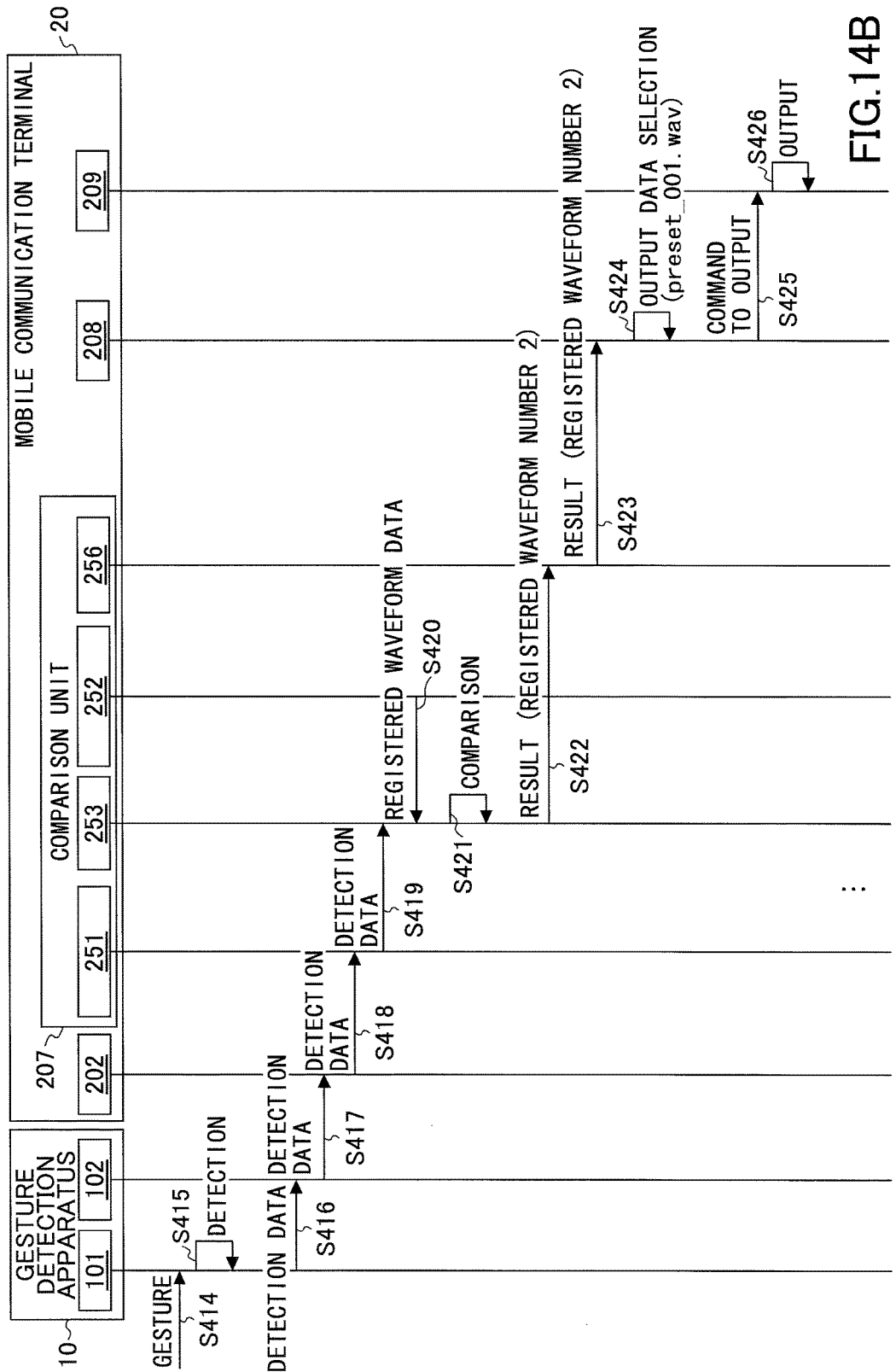

FIG.16

| REGISTERED WAVEFORM NUMBER | 1 | 2 | 3 |
|---|---|---|---|
| GESTURE 1 | 720 | 1019 | 1170 |
| GESTURE 2 | 1083 | 729 | 1158 |
| GESTURE 3 | 775 | 891 | 727 |

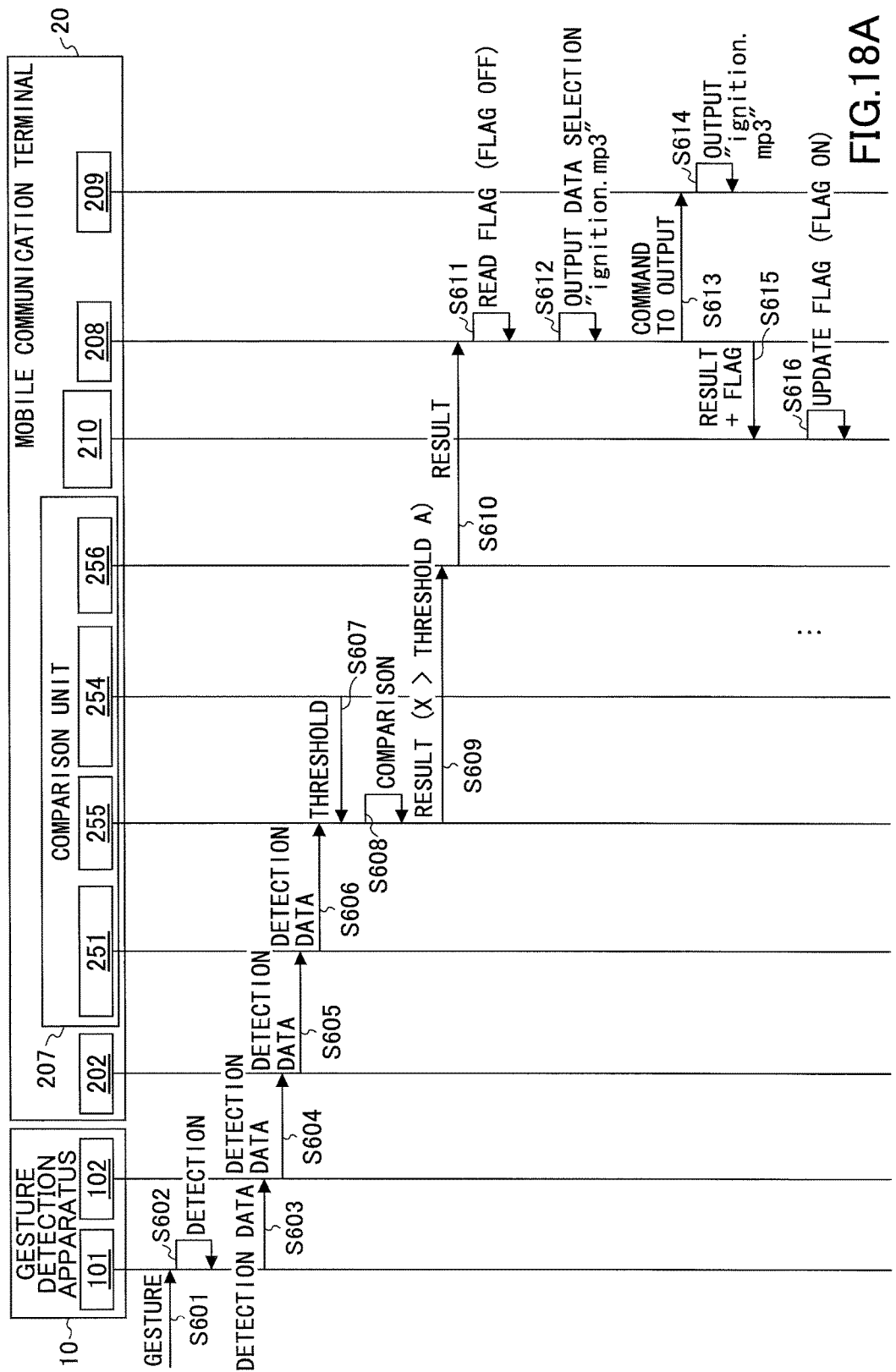

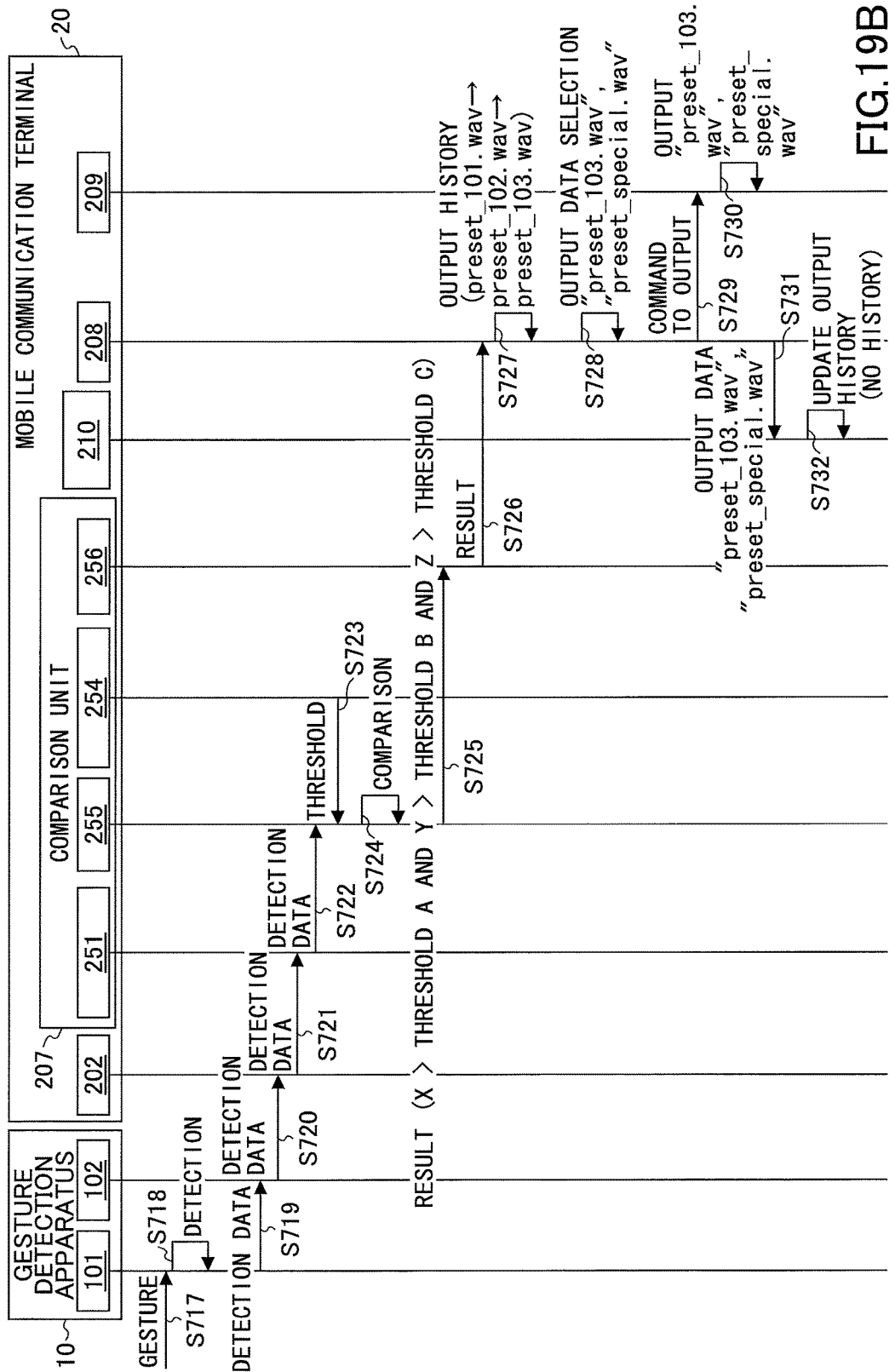

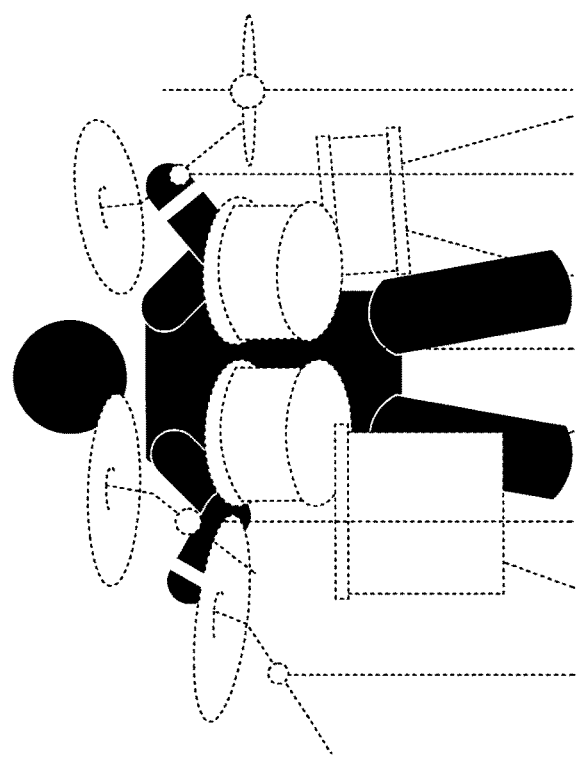
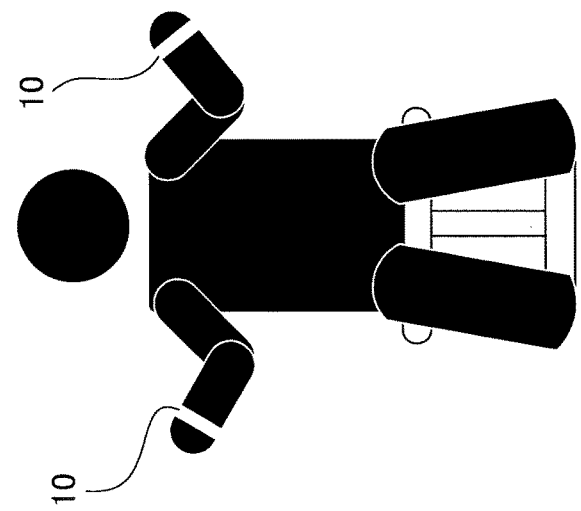
FIG.20B
FIG.20A

FIG.24

| CONDITION OF RELATIVE ATTITUDE DATA (THRESHOLD) | CONDITION OF DETECTION DATA (THRESHOLD) | OUTPUT DATA |
|---|---|---|
| $-Q7 \leq Q < -Q6$ | $Z > A$ | preset_110.wav |
| | $Z > A, X > B$ | preset_111.wav |
| | $Z > A, X > B, Y > C$ | preset_112.wav |
| $-Q5 \leq Q < -Q4$ | $Z > A$ | preset_120.wav |
| | $Z > A, X > B$ | preset_121.wav |
| | $Z > A, X > B, Y > C$ | preset_122.wav |
| $-Q3 \leq Q < -Q2$ | $Z > A$ | preset_130.wav |
| | $Z > A, X > B$ | preset_131.wav |
| | $Z > A, X > B, Y > C$ | preset_132.wav |
| $-Q1 \leq Q < Q0$ | $Z > A$ | preset_140.wav |
| | $Z > A, X > B$ | preset_141.wav |
| | $Z > A, X > B, Y > C$ | preset_142.wav |
| $Q1 \leq Q < Q2$ | $Z > A$ | preset_150.wav |
| | $Z > A, X > B$ | preset_151.wav |
| | $Z > A, X > B, Y > C$ | preset_152.wav |
| $Q3 \leq Q < Q4$ | $Z > A$ | preset_160.wav |
| | $Z > A, X > B$ | preset_161.wav |
| | $Z > A, X > B, Y > C$ | preset_162.wav |
| $Q5 \leq Q < Q6$ | $Z > A$ | preset_170.wav |
| | $Z > A, X > B$ | preset_171.wav |
| | $Z > A, X > B, Y > C$ | preset_172.wav |

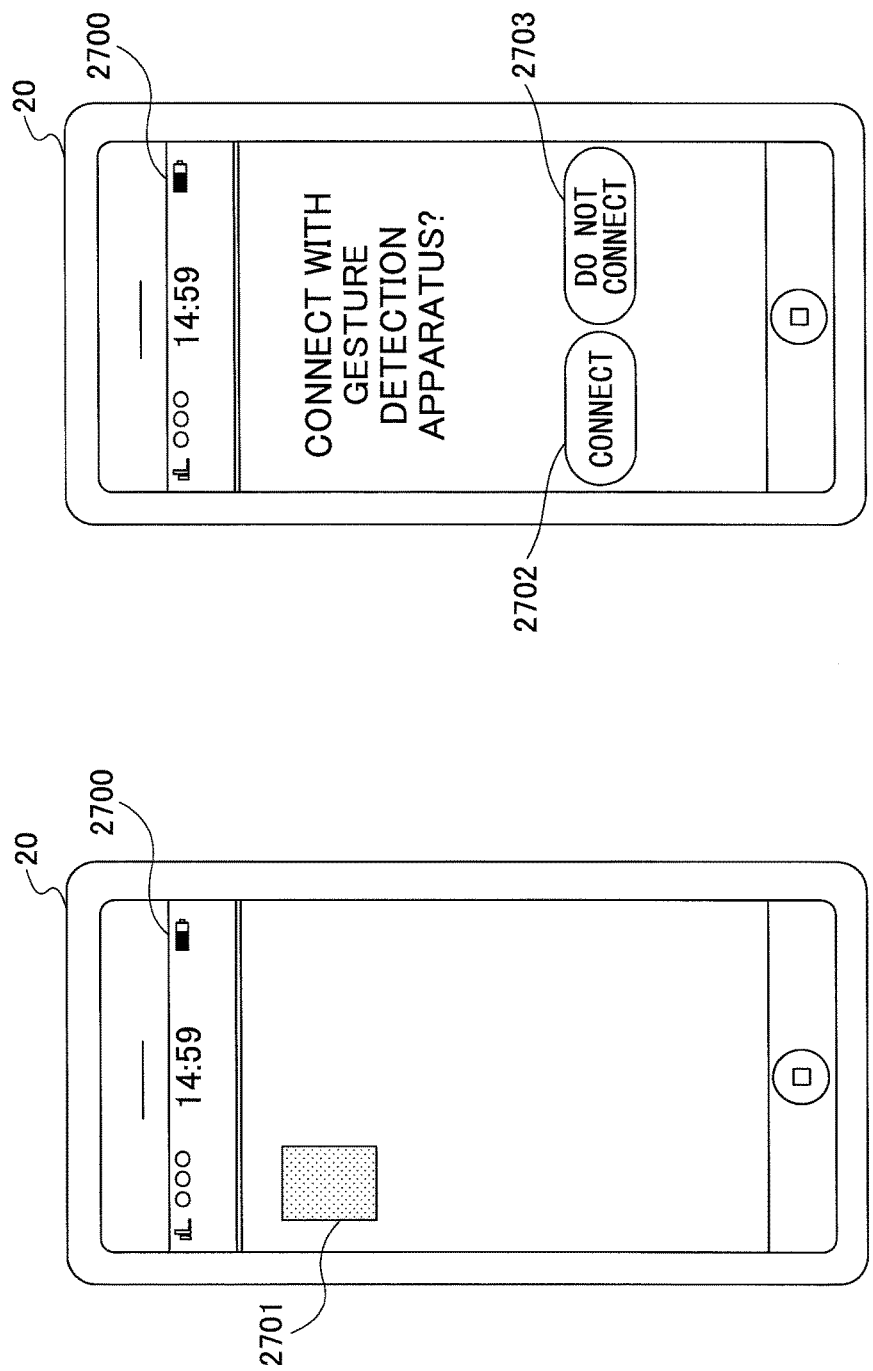

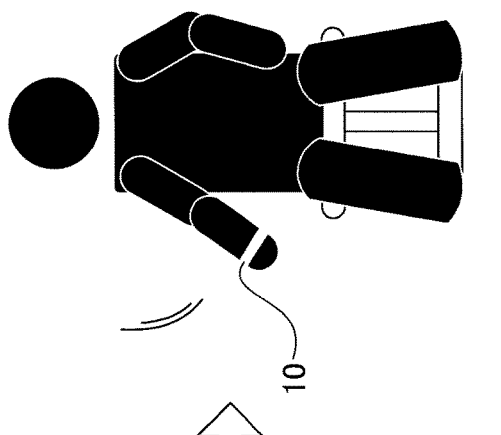
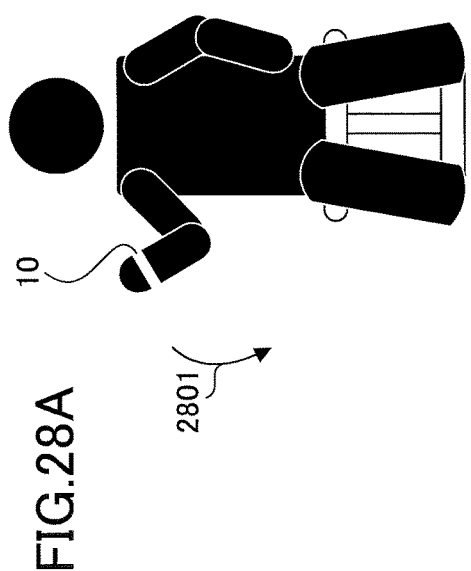
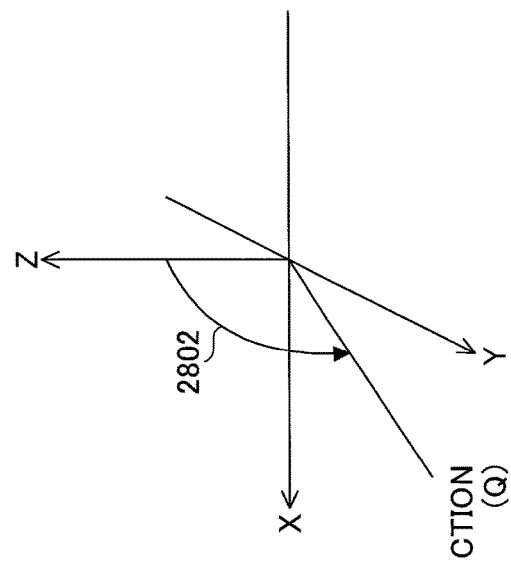
FIG.28A
FIG.28B
FIG.28C

GESTURE DETECTION SYSTEM, GESTURE DETECTION APPARATUS, AND MOBILE COMMUNICATION TERMINAL

FIELD

The present invention relates to a gesture detection system, a gesture detection apparatus, and a mobile communication terminal.

BACKGROUND

Systems using gesture detection apparatuses have become popular that have sensors built in, such as acceleration sensors or angular velocity sensors, and/or optical sensors to detect user's gestures. For example, a system has been known that provides an intuitive play, by detecting a user's gesture through a controller having an acceleration sensor built in, and associates the detection result with a character's motion in a video game (Patent Document 1 and Patent Document 2).

Also, technologies have been proposed to detect a user's motion (such as patting or stroking) on a robot that reproduces a content, and to have the robot reproduce the content depending on the detection result (Patent Document 3); to control a device by combining detection results of user's gestures and voice (Patent Document 4); and the like.

Further, algorithms have been known that identify a user's gesture by determining whether a detected user's gesture is matched with a gesture registered in advance, for example, an algorithm called "Dynamic Time-Warping" (Non-Patent Documents 1-2).

RELATED-ART DOCUMENTS

Patent Documents

[Patent Document 1] U.S. Patent Application No. 2008-0015017
[Patent Document 2] Japanese Laid-open Patent Publication No. 2007-300980
[Patent Document 3] Japanese Laid-open Patent Publication No. 2012-155616
[Patent Document 4] Japanese Laid-open Patent Publication No. 2012-103840

Non-Patent Document

[Non-Patent Document 1] C. S. MYERS and L. R. RABINER, "A Comparative Study of Several Dynamic Time-Warping Algorithms for Connected-Word Recognition", THE BELL SYSTEM TECHNICAL JOURNAL, Vol.60, No.7, September 1981
[Non-Patent Document 2] "Dynamic time warping", Wikipedia On the other hand, there is a need for a gesture detection apparatus having a sensor built in to detect a user's gesture, to be used for a convenient play. For example, by using such a gesture detection apparatus for so-called "conventional toys" (toys that do not output a sound or an image), such as model vehicles, model arms, and stuffed toys, to output sounds or images of corresponding toys, one can expect that reality is improved for a play using such a conventional toy.

In view of the above problem, at least one of the embodiments of the present invention has an object to improve reality in a play.

SUMMARY

According to at least one of the embodiments of the present invention, a gesture detection system having a gesture detection apparatus configured to detect a gesture of a user, and a mobile communication terminal configured to be capable of communicating with the gesture detection apparatus, includes a storage unit configured to store first gesture data defining the gesture of the user, and audio or visual data being associated with the first gesture data; an obtainment unit configured to obtain second gesture data representing the gesture of the user; a transmission unit configured to transmit the second gesture data to the mobile communication terminal; a determination unit configured to determine whether the gesture defined by the first gesture data and the gesture represented by the second gesture data transmitted by the transmission unit are the same gesture; a selection unit configured to select the audio or visual data being associated with the first gesture data depending on a result of the determination unit; and an output unit configured to output the audio or visual data selected by the selection unit.

According to at least another of the embodiments of the present invention, a gesture detection apparatus attached to a toy operated by a user, or a wrist the user, includes a housing; and a belt configure to be attached to the housing on two opposite side surfaces of the housing, for having the gesture detection apparatus attached to the toy operated by the user, or the wrist of the user. The housing includes an obtainment unit configured to obtain gesture data representing a gesture of a user, and a transmission unit configured to transmit the gesture data to a mobile communication terminal. If the mobile communication terminal determines that the gesture represented by the received gesture data, and a gesture defined by the gesture data being associated with audio or visual data are the same gesture, the mobile communication terminal outputs the audio or visual data.

According to at least another of the embodiments of the present invention, a mobile communication terminal configured to be capable of communicating with a gesture detection apparatus configured to detect a gesture of a user, includes a storage unit configured to store first gesture data defining the gesture of the user, and audio or visual data being associated with the first gesture data; a reception unit configured to receive second gesture data representing the gesture of the user from the gesture detection apparatus; a determination unit configured to determine whether the gesture defined by the first gesture data and the gesture received by the second gesture data transmitted by the reception unit are the same gesture; a selection unit configured to select the audio or visual data being associated with the first gesture data depending on a result of the determination unit; and an output unit configured to output the audio or visual data selected by the selection unit.

According to at least another of the embodiments of the present invention, a non-transitory computer-readable recording medium having a program stored therein for causing a computer to execute a process, the computer configured to be capable of communicating with a gesture detection apparatus configured to detect a gesture of a user, the process includes receiving first gesture data representing the gesture of the user from the gesture detection apparatus; determining whether a gesture represented by the first gesture data received by the receiving, and a gesture defined by second gesture data stored in a storage unit and being associated with audio or visual data, are the same gesture;

selecting the audio or visual data depending on a result of the determining; and outputting the audio or visual data selected by the selecting.

According to at least one of the embodiments of the present invention, reality in a play can be improved.

BRIEF DESCRIPTION OF DRAWINGS

FIG. 8 is a diagram illustrating an example of a table to hold association data;

FIG. 9 is a diagram illustrating an example of a table to hold association data;

FIG. 10 is a diagram illustrating an example of a table to hold association data;

FIGS. 14A-14B are sequence charts representing a specific example of an output process;

FIG. 16 is a diagram illustrating a comparison result between registered waveform data and detection data;

FIGS. 18A-18B are sequence charts representing a specific example of an output process;

FIGS. 19A-19B are sequence charts representing a specific example of an output process;

FIGS. 20A-20B are diagrams illustrating examples of use of a gesture detection system according to a second embodiment of the present invention;

FIG. 24 is a diagram illustrating an example of a table to hold association data;

FIGS. 27A-27F are diagrams illustrating examples of a display screen of a mobile communication terminal;

FIGS. 28A-28C are diagrams illustrating a process to determine a reference direction;

DESCRIPTION OF EMBODIMENTS

Figure 1A:
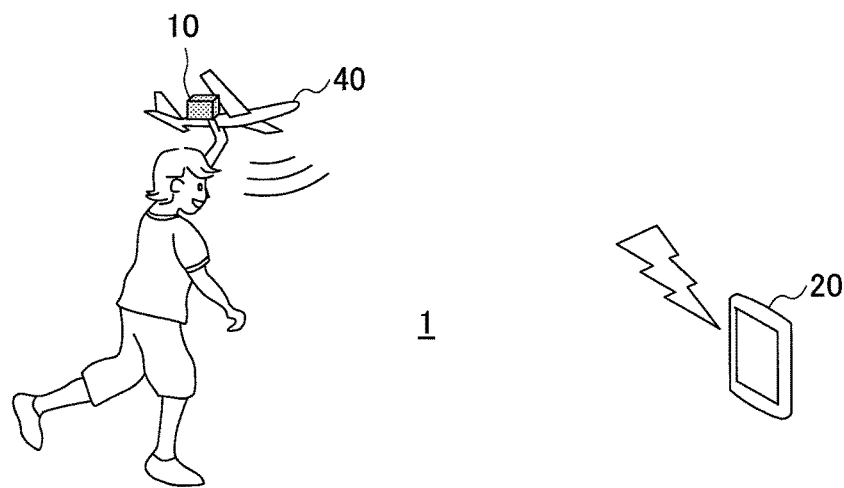
FIGS. 1A-1C are diagrams illustrating examples of use of a gesture detection system according to a first embodiment of the present invention.

In the following, embodiments of the present invention will be described with reference to the drawings.

[First Embodiment]
1. Overview
2. Hardware configuration
   Gesture detection apparatus
   Mobile communication terminal
3. Functions
   Gesture detection apparatus
   Mobile communication terminal
      Basic function
      Registration function
      Output function
4. Operational examples
   Registration process
   Output process
   Specific example of registration process
   Specific example of output process
   Example using threshold data/application data
   Example using flag set effective depending on predetermined operation
   Example using history of output data
5. Application examples <<1. Overview>>

First, using FIG. 1, an overview of a first embodiment of the present invention will be described. FIGS. 1A-1C are diagrams illustrating examples of use of a gesture detection system 1 according to the first embodiment of the present invention. The gesture detection system 1 includes a gesture detection apparatus 10 that may be attached to a toy 40 held by a user or a user himself/herself, and a mobile communication terminal 20 capable of communicating with the gesture detection apparatus 10. The gesture detection apparatus 10 and the mobile communication terminal 20 can communicate with each other by a wireless communication method such as BLUETOOTH (trademark) or ZIGBEE (trademark).

The user operates the toy 40, which may be a model airplane or passenger car, in a state where the toy 40 has the gesture detection apparatus 10 attached. The gesture detection apparatus 10 has an acceleration sensor built in to detect acceleration data of a gesture performed by the user when operating the toy 40, and transmits the data to the mobile communication terminal 20 as occasion calls. If a change of the received acceleration data (waveform) is matched with a waveform registered in advance, the mobile communication terminal 20 outputs a sound corresponding to the registered waveform. The mobile communication terminal 20 has various waveforms registered to hold sounds corresponding to respective waveforms. This makes it possible for the user to hear sounds corresponding to respective toys while operating various toys. Consequently, the user can experience imagination more in a convenient and intuitive play, and can enjoy the play with reality. Note that, other than the acceleration sensor, the gesture detection apparatus 10 may include an arbitrary sensor such as a gyro sensor, an optical sensor, and/or a pressure sensor.

FIG. 1A represents an example where the user attaches the gesture detection apparatus 10 to a toy 40 (model airplane) to play with, and makes the mobile communication terminal 20 (smart phone) output the sound. In this example, when the user makes an operation, for example, to accelerate the model airplane, an engine sound at high revolution is output, or makes an operation to decelerate, an engine sound at low revolution is output.

Figure 1B:
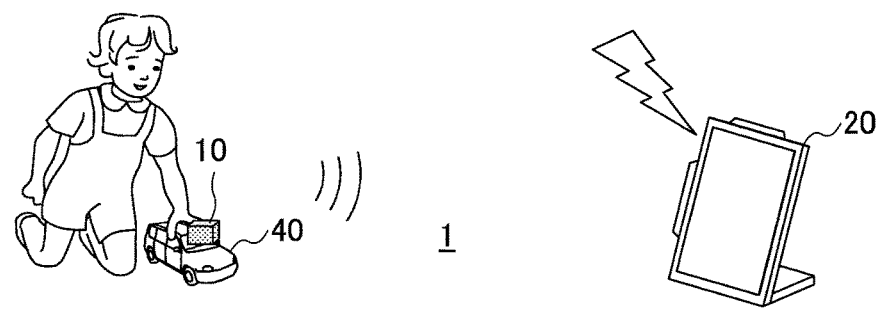

FIG. 1B represents an example where the user attaches the gesture detection apparatus 10 to a toy 40 (model passenger car) to play with, and makes the mobile communication terminal 20 (smart phone) output the sound. In this example, when the user makes an operation, for example, to move the model passenger car forward, an engine ignition sound is output, or makes an operation to turn the model passenger car to the left of right, a tire slip sound is output.

Figure 1C:
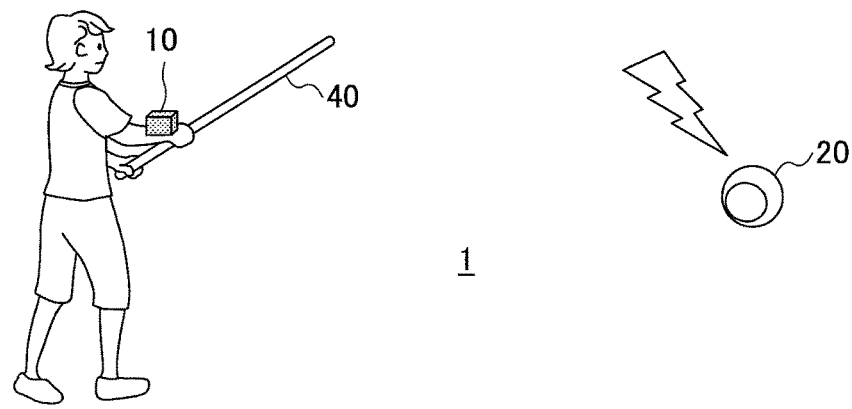

FIG. 1C represents an example where the user attaches the gesture detection apparatus 10 on his arm, holds a toy 40 (model sword) to play with, and makes the mobile communication terminal 20 (loudspeaker) output the sound. In this example, different sounds may be output depending on how the model sword is swung. In this way, the user can attach the gesture detection apparatus 10 not only to a toy 40, but also on his arm.

Note that it is assumed multiple gesture detection applications are provided on the mobile communication terminal 20 depending on different types of toys 40 or operational differences. Therefore, even if a user plays with an existing toy, for example, that does not output a sound or an image, it is possible to output various sounds by selecting a gesture detection application in accordance with the type of the toy. Note that although a smart phone, a tablet, and a loudspeaker are taken as examples of the mobile communication terminal 20 in the above description, the present invention is not limited to these examples, but a note PC or a display may be used.

Figure 2A:
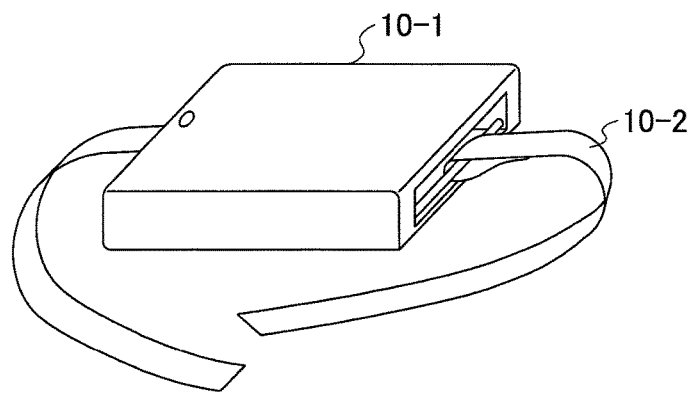
FIGS. 2A-2C are diagrams illustrating appearances of a gesture detection apparatus.
Figure 2B:
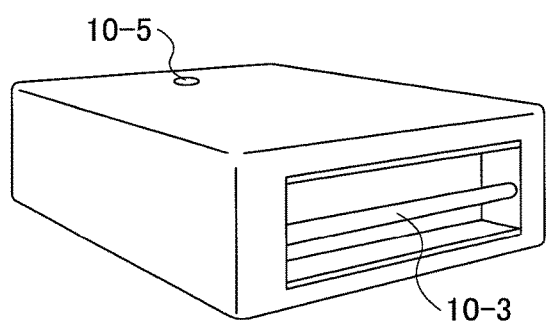
Figure 2C:
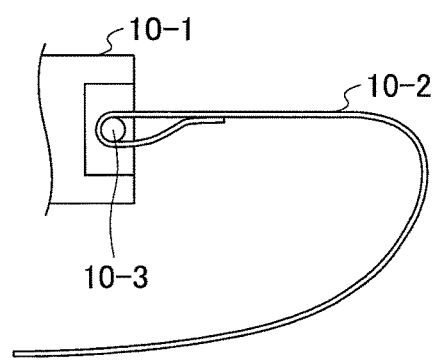

FIGS. 2A-2C are diagrams illustrating appearances of the gesture detection apparatus 10. As illustrated in FIG. 2A, the gesture detection apparatus 10 includes a housing 10-1 to have a sensor, a wireless communication apparatus, and the like built in, and a belt 10-2 to attach the gesture detection apparatus 10 to a toy 40 or a user's arm or wrist. The belt 10-2 is tied on two opposite side surfaces of housing 10-1. FIG. 2B is an enlarged view of a connection part 10-3 of the housing 10-1 and the belt 10-2. As illustrated in FIG. 2B, the gesture detection apparatus 10 may have a hole 10-5 to take in light. FIG. 2C is a cross-sectional view of the connection part 10-3 of the housing 10-1 and the belt 10-2.

Note that the gesture detection apparatus 10 may have any configuration as long as it can be attached to a toy 40 or a user's arm or wrist, for example, a cable, a tape, a magnet, a clip, or the like may be used instead of the belt 10-2.

<<2. Hardware Configuration>>

Using FIG. 3 and FIG. 4, the hardware configuration of the gesture detection apparatus 10 and the mobile communication terminal 20 will be described according to the first embodiment of the present invention.

<<Gesture Detection Apparatus>>

Figure 3:
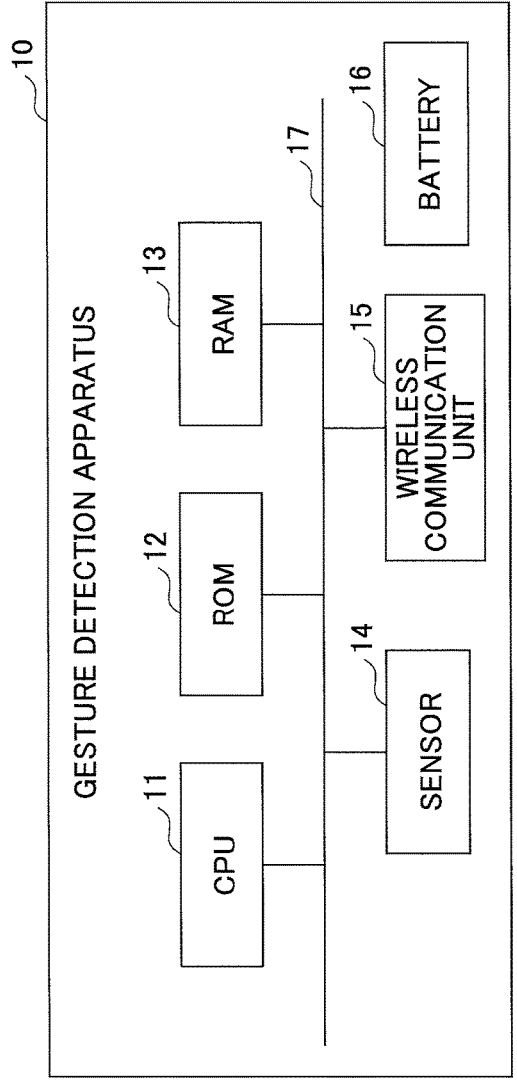
FIG. 3 is a diagram illustrating a hardware configuration of a gesture detection apparatus.

FIG. 3 is a diagram illustrating the hardware configuration of the gesture detection apparatus 10 according to the first embodiment of the present invention. The gesture detection apparatus 10 includes a CPU 11, a ROM 12, a RAM 13, a sensor 14, a wireless communication unit 15, and a battery 16.

The CPU 11 executes a program to control the gesture detection apparatus 10. The ROM 12 stores the program executed by the CPU 11 and data required for executing the program. The RAM 13 functions as a work area of the CPU 11. The sensor 14 is a sensor to detect a user's gesture, for example, an acceleration sensor. The acceleration sensor detects triaxial acceleration data in directions for example, X, Y, and Z-axes. Also, the sensor 14 may be an angular velocity sensor, an optical sensor, or a pressure sensor. Or, the sensor 14 may be an arbitrary combination of these sensors. The following description assumes that the sensor 14 is an acceleration sensor. The wireless communication unit 15 is a communication device using a wireless communication method such as BLUETOOTH or ZIGBEE. The battery 16 supplies electric power to drive the gesture detection apparatus 10. The bus 17 mutually connects the devices other than the battery 16.

<<Mobile Communication Terminal>>

Figure 4:
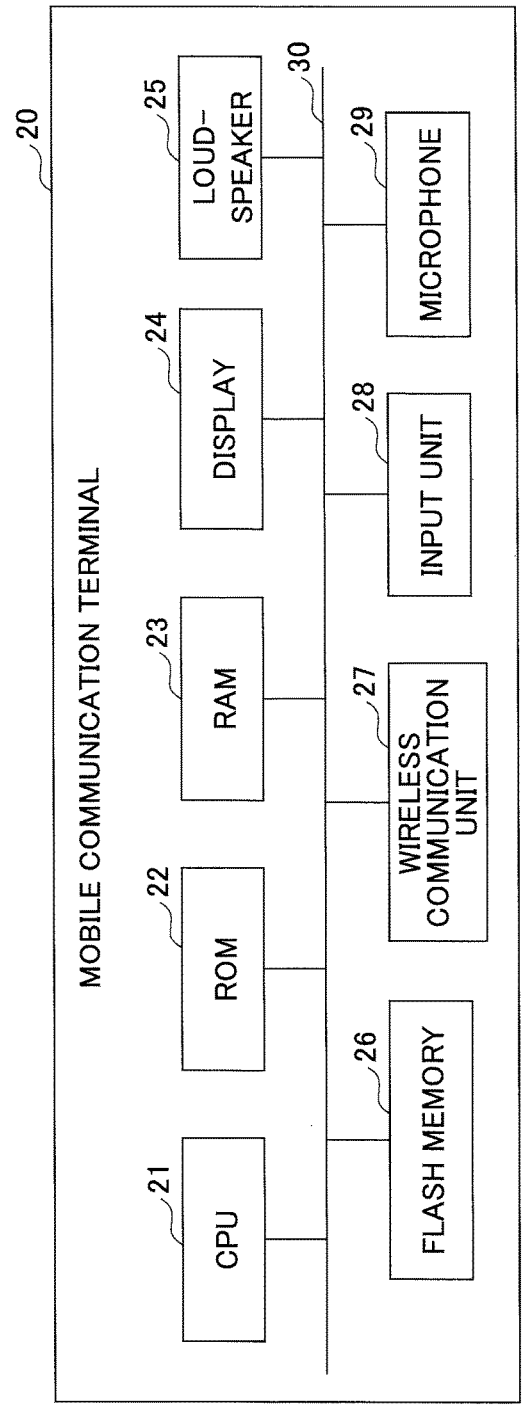
FIG. 4 is a diagram illustrating a hardware configuration of a mobile communication terminal.

FIG. 4 is a diagram illustrating the hardware configuration of the mobile communication terminal 20. FIG. 4 illustrates an example of the hardware configuration where the mobile communication terminal 20 is a smart phone. The mobile communication terminal 20 includes a CPU (computer) 21, a ROM 22, a RAM 23, a display 24, a loudspeaker 25, a flash memory 26, a wireless communication unit 27, an input unit 28, and a microphone 29.

The CPU 21 executes a program to control the mobile communication terminal 20 (for example, multiple gesture detection applications depending on different types of toys 40 or operational differences). The ROM 22 stores the program executed by the CPU 21 and data required for executing the program. The RAM 23 functions as a work area of the CPU 21. The display 24 is a device to output image data, for example, by driving an LCD panel. The loudspeaker 25 is a device to output audio data by changing an electric signal into physical vibration. The flash memory 26, similarly to the ROM 22, stores the program executed by the CPU 21 and data required for executing the program. Also, the flash memory 26 is used for storing large-capacity data such as audio data and image data. The wireless communication unit 27 is a communication device using a wireless communication method such as BLUETOOTH or ZIGBEE. The input unit 28 is a device to receive an operation from a user such as a keyboard, operation buttons or a touch panel. The microphone 29 is a device to convert physical vibration of a sound into an electric signal. The bus 30 mutually connects the devices.

<<3. Functions>>

Figure 5:
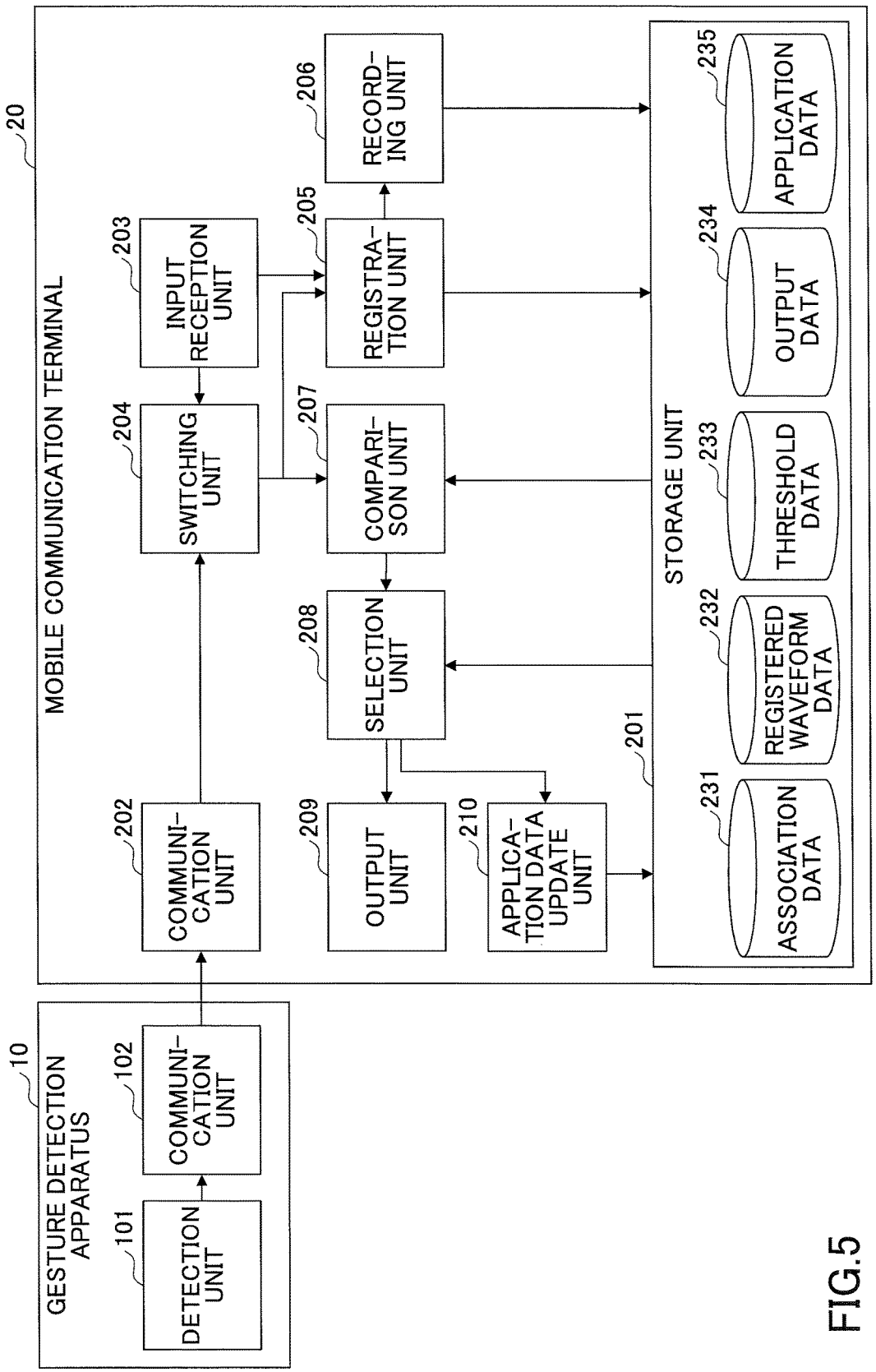
FIG. 5 is a functional block diagram of a gesture detection system.
Figure 6:
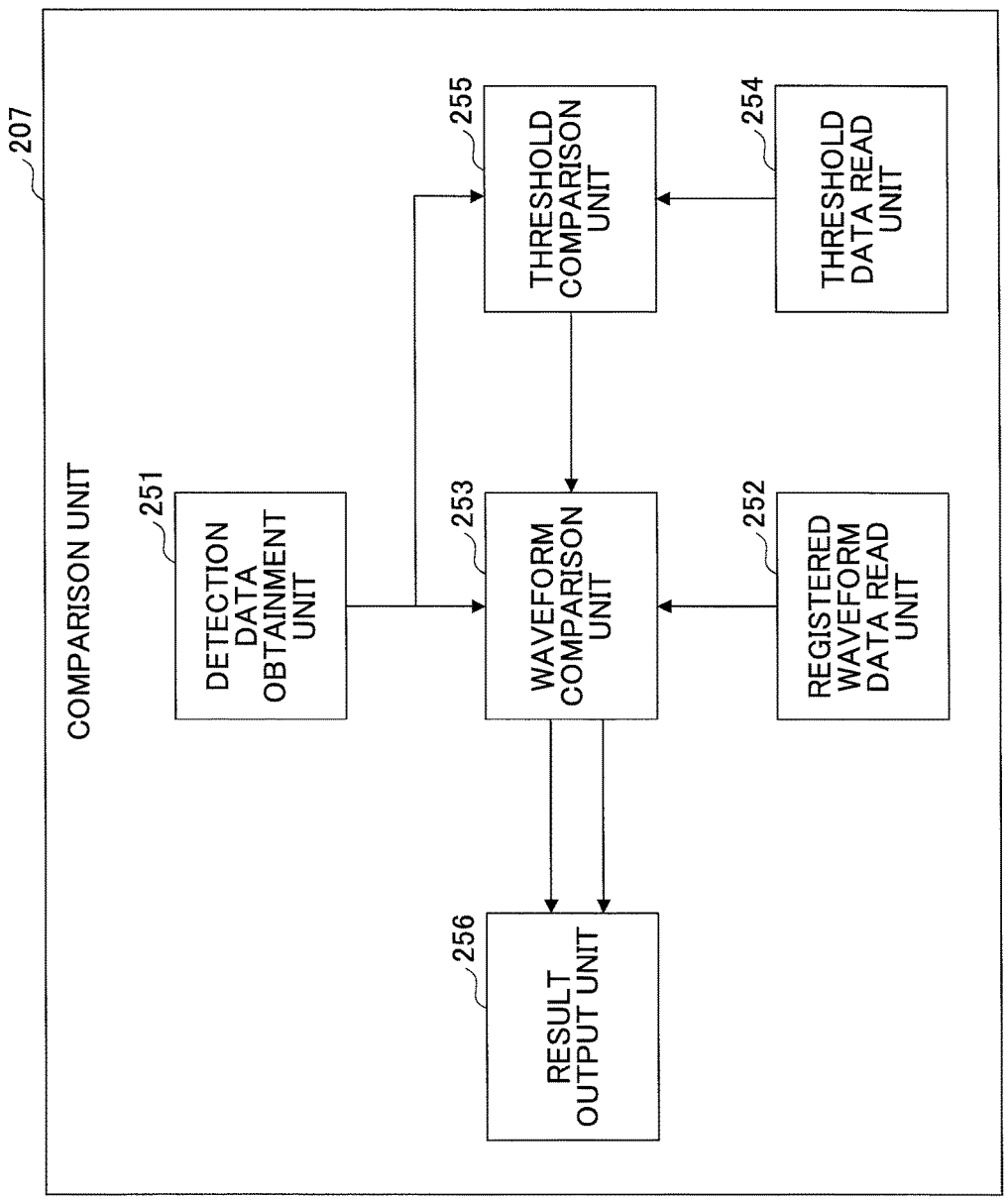
FIG. 6 is a detailed functional block diagram of a gesture detection system.

Using FIG. 5 and FIG. 6, functional blocks of the gesture detection system 1 will be described according to the first embodiment of the present invention. FIG. 5 is a functional block diagram of the gesture detection system.

<<Gesture Detection Apparatus>>

First, using FIG. 5, functions of the gesture detection apparatus 10 will be described according to the first embodiment of the present invention. The gesture detection apparatus 10 includes a detection unit 101 and a communication unit 102.

The detection unit 101 includes the sensor 14 in FIG. 3, to detect a user's gesture, transmits gesture data representing the gesture (called "detection data" below) to the mobile communication terminal 20 through the communication unit 102 as occasion calls. For example, if the sensor 14 is an acceleration sensor, the detection unit 101 detects triaxial acceleration data in response to a user's gesture.

The communication unit 102 includes the wireless communication unit 15 in FIG. 3 to transmit triaxial acceleration data detected by the detection unit 101 as the detection data to the mobile communication terminal 20 via wireless communication (namely, the communication unit 102 functions as a transmission unit of the detection data).

<<Mobile Communication Terminal>>

Next, using FIG. 5, functions of the mobile communication terminal 20 will be described according to the first embodiment of the present invention. Note that, in the following, the functions of the mobile communication terminal 20 will be separately described in terms of basic functions, a registration function, and an output function.

<<Basic Functions>>

As illustrated in FIG. 5, the mobile communication terminal 20 includes a storage unit 201, a communication unit 202, an input reception unit 203, and a switching unit 204.

The storage unit 201 includes the ROM 22 and the flash memory 26 in FIG. 4 to store association data 231, registered waveform data 232, threshold data 233, output data 234, and application data 235.

The association data 231 is data to associate each user's gesture (gesture) with audio or visual data to be output (output data). The association data 231 is held in a table, for example, as illustrated in FIG. 8, FIG. 9, or FIG. 10. FIG. 8, FIG. 9, and FIG. 10 are examples of tables to hold association data 231-1, 231-2, and 231-3 used for respective aspects.

Figure 7A:
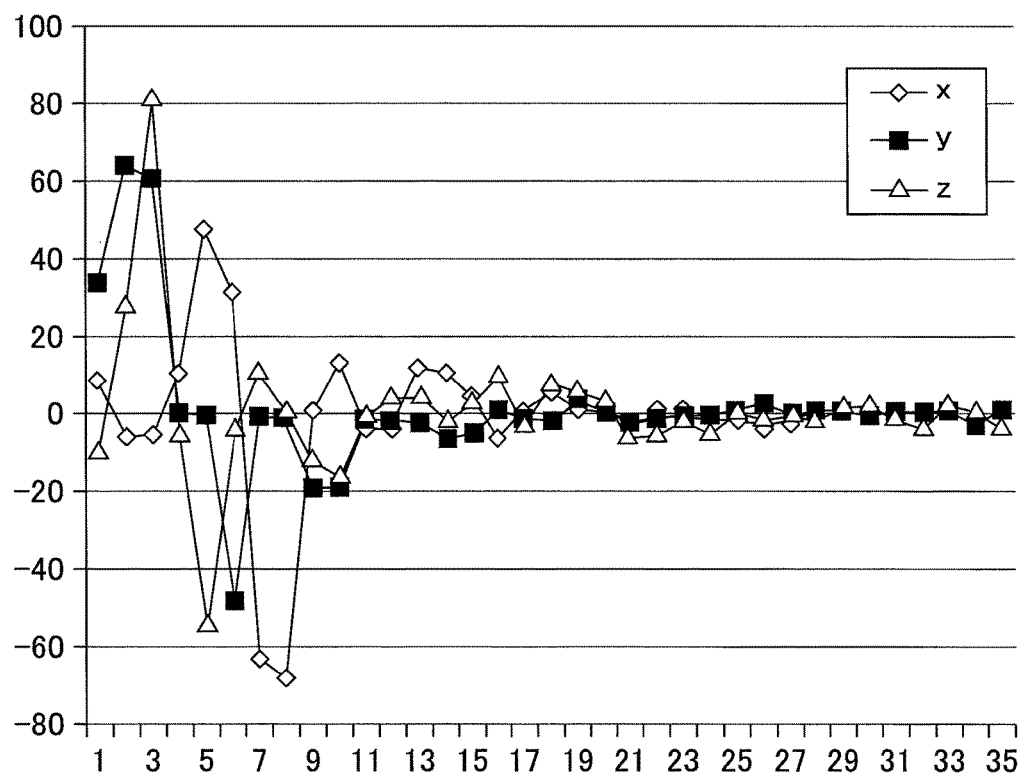
FIGS. 7A-7B are diagrams illustrating examples of waveforms of detection data when a user makes a gesture.

The table holding the association data 231-1 illustrated in FIG. 8 includes information items of "registered waveform number" and "output data". The "registered waveform number" is a number attached to a piece of waveform data (registered waveform data) that represents an acceleration change including triaxial acceleration data detected in response to a user's gesture. Pieces of the registered waveform data having different registered waveform numbers attached represent different gestures of the user. An example of a piece of registered waveform data registered in advance is illustrated in FIG. 7A. Note that the registered waveform data itself is separately stored in the storage unit 201. The "output data" includes information to identify audio or visual data that is output when receiving the same detection data (triaxial acceleration data) as the registered waveform data, as input from the gesture detection apparatus 10. In the example in FIG. 8, filenames of pieces of audio or visual data are described.

The tables holding the association data 231-2 and 231-3 illustrated in FIG. 9 and FIG. 10 include information items of "condition (threshold)", "condition (application data), and "output data", respectively. The "condition (threshold)" includes thresholds to identify a user's gesture based on the detection data (triaxial acceleration data) transmitted from the gesture detection apparatus 10. The "condition (application data)" includes a condition to switch output data based on the application data 235 separately stored in the storage unit 201. Note that the application data 235 may be, for example, a flag representing a state of a toy 40 that is set effective depending on a predetermined gesture (if the toy 40 is a passenger car, a flag representing a state whether the ignition is on or off). Alternatively, the application data 235 may be data representing an output history of audio or visual data that has been output as the output data. In either case, the application data 235 is used for switching output data. The "output data" describes the filename of audio or visual data that is output when the detection data satisfying the "condition (threshold)" is received from the gesture detection apparatus 10 as input, and the "condition (application data)" is satisfied.

Referring to FIG. 5 again, the registered waveform data 232 is data used for identifying a user's gesture in the association data 231-1. The registered waveform data 232 is waveform data representing a change of acceleration that includes acceleration data in X-axis, Y-axis, and Z-axis directions during a predetermined period. FIG. 7A is an example of a piece of the registered waveform data 232.

The threshold data 233 is data used for identifying a user's gesture in the association data 231-2 or 231-3. The threshold data 233 includes thresholds that are compared with maximum values of the detection data (triaxial acceleration data) transmitted from the gesture detection apparatus 10. The threshold data 233 includes thresholds A, B, and C as illustrated in the association data 231-2 and 231-3 in FIG. 9 and FIG. 10.

The output data 234 is audio or visual data that is provided as files having arbitrary formats as illustrated in FIG. 8, FIG. 9, and FIG. 10. Also, the output data 234 may be moving picture files such as avi, 3gp, or mov format (not illustrated). Also, the output data 234 may be vibration data to generate vibration having predetermined patterns for the mobile communication terminal 20 (not illustrated).

The application data 235 is provided for each gesture detection application to be executed on the mobile communication terminal 20, which is data used for selecting the output data. The application data 235 includes a flag representing a state of a toy 40 that is set effective depending on a predetermined gesture, and data representing an output history of the output data.

The communication unit 202 includes the wireless communication unit 27 in FIG. 4, which establishes a wireless connection with the gesture detection apparatus 10, and receives the detection data transmitted from the gesture detection apparatus 10 (namely, functions as a reception unit of the detection data).

The input reception unit 203 includes the input unit 28 in FIG. 4 that receives an operational input from the user.

The switching unit 204 is implemented as a process of the CPU 21 in FIG. 4 that switches functions implemented by the mobile communication terminal 20 (the registration function and the output function as will be described later) depending on an operational input from the user received by the input reception unit 203.

<<Registration Function>>

A gesture detection application of the mobile communication terminal 20 includes a registration function that associates detection data detected in response to a user's gesture with output data provided in advance, or new output data obtained by a recording. To implement the registration function, the mobile communication terminal 20 includes a registration unit 205 and a recording unit 206.

The registration unit 205 is implemented as a process of the CPU 21 in FIG. 4 that stores detection data detected in response to a user's gesture, in the storage unit 201 as the registered waveform data. Also, the registration unit 205 associates a registered waveform number representing the registered waveform data with output data provided in advance, or new output data obtained by a recording, and adds the associated data into the table (FIG. 8) as the association data 231-1.

Specifically, the registration unit 205 first receives a number to be attached to the detection data that is to be detected in response to a gesture to be registered, as input from the user through the input reception unit 203. The input number is used for the registered waveform number in the association data 231-1. Next, the registration unit 205, through the input reception unit 203, receives a selection on the output data to be associated with the detection data detected in response to a user's gesture, which is selected among those provided in advance, or one that is to be newly recorded. If the user selects the latter, the output data is recorded through the recording unit 206 as will be described later. Next, the registration unit 205 issues an indication to the user to perform a gesture to be registered, and receives the detection data detected by the gesture detection apparatus 10 in response to the user's gesture. Then, the registration unit 205 associates the input number with the detection data to store the association as new registered waveform data 232 in the storage unit 201. Finally, the registration unit 205 adds a new entry in the table (FIG. 8) as the association data 231-1 that has the input number and the filename of the output data selected or recorded.

The recording unit 206 includes the microphone 29 in FIG. 4 to record output data in response to a command from the registration unit 205.

<<Output Function>>

A gesture detection application of the mobile communication terminal 20 also includes an output function that receives detection data detected by the gesture detection apparatus 10, and when the detection data satisfies a predetermined condition, outputs predetermined output data. To implement the output function, the mobile communication terminal 20 includes a comparison unit 207, a selection unit 208, an output unit 209, and an application data update unit 210.

The comparison unit 207 is implemented as a process of the CPU 21 in FIG. 4 that compares the detection data received from the gesture detection apparatus 10 with the registered waveform data or the thresholds, and transfers the comparison result to the selection unit 208. FIG. 6 is a detailed functional block diagram of the comparison unit 207. The comparison unit 207 includes a detection data obtainment unit 251, a registered waveform data read unit 252, a waveform comparison unit 253, a threshold data read unit 254, a threshold comparison unit 255, and a result output unit 256.

The detection data obtainment unit 251 obtains the detection data received from the gesture detection apparatus 10. The registered waveform data read unit 252 reads the registered waveform data 232 stored in the storage unit 201.

Figure 7B:
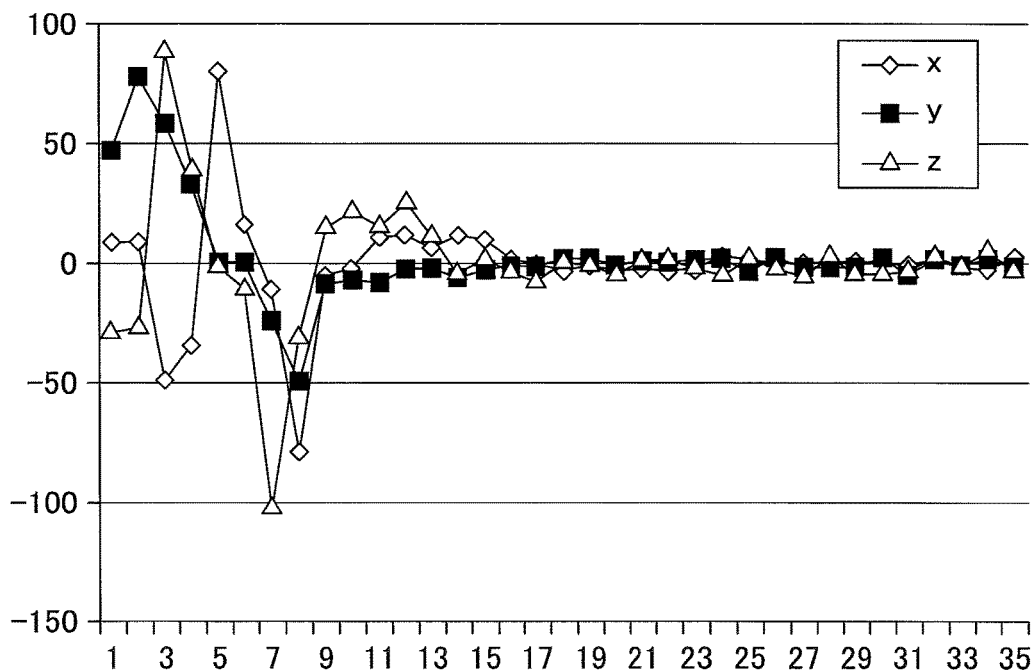

The waveform comparison unit 253 compares the detection data obtained by the detection data obtainment unit 251 (for example, FIG. 7B) with the registered waveform data read by the registered waveform data read unit 252 (for example, FIG. 7A), to identify the registered waveform data analogous to the detection data. Specifically, the waveform comparison unit 253 executes pattern matching by an existing technology disclosed in, for example, Non-Patent Document 1 or 2, to identify the registered waveform number of the registered waveform data analogous to the detection data. According to a method described in Non-Patent Document 1 or 2, similarity between the detection data and the registered waveform data can be obtained by the "distance" between the bundles of data (a higher similarity has a shorter distance). Here, description of a specific calculation method of the distance is omitted.

The waveform comparison unit 253 transfers the identified registered waveform number to the result output unit 256. Note that if analogous registered waveform data is not found (namely, calculated distances are all great), the waveform comparison unit 253 may transfer a result to the result output unit 256, stating that no corresponding registered waveform number is found. Alternatively, regardless of the distances between the detection data and the registered waveform data, the waveform comparison unit 253 may always identify the registered waveform data having the smallest calculated distance to transfer the registered waveform number to the result output unit 256.

The threshold data read unit 254 reads the threshold data 233 stored in the storage unit 201. The threshold comparison unit 255 compares maximum values of acceleration data for the axis directions included in the detection data obtained by the detection data obtainment unit 251 (for example, FIG. 7B) with the thresholds A, B, and C of the respective axes in the threshold data 233 read by the threshold data read unit 254. Also, the threshold data read unit 254 transfers the comparison result to the result output unit 256. The result output unit 256 outputs the result received from the waveform comparison unit 253 or the threshold comparison unit 255 to the selection unit 208.

In this way, the comparison unit 207 functions as a determination unit to determine whether a user's gesture is the same as one of gestures registered in advance, based on the detection data itself or based on the maximum values of the detection data.

Referring to FIG. 5 again, the selection unit 208 is implemented by a process of the CPU 21 in FIG. 4. When receiving a result (namely, a comparison result of the registered waveform number or the thresholds) from the comparison unit 207 (the result output unit 256), the selection unit 208 refers to the association data 231 (one of FIG. 8 to FIG. 10). Also, the selection unit 208 refers to the application data 235 stored in the storage unit 201 if necessary. Then, the selection unit 208 selects the output data that corresponds to the registered waveform number (FIG. 8), or the output data that satisfies the condition of the thresholds or the application data (FIG. 9 or FIG. 10). Then, the selection unit 208 transfers the selected output data to the output unit 209. Moreover, the selection unit 208 may transfer the result received from the comparison unit 207 (the result output unit 256) and the selected output data to the application data update unit 210.

The output unit 209 includes the display 24 or the loudspeaker 25 in FIG. 4, to output data received from the selection unit 208.

The application data update unit 210 is implemented as a process of the CPU 21 in FIG. 4 that updates the application data 235 using the result received from the selection unit 208 and the selected output data. For example, the application data update unit 210 sets the flag on or off if maximum values in the respective axis directions of the acceleration data included in the detection data satisfy a predetermined condition (thresholds). Alternatively, the application data update unit 210 adds the filename of the output data output by the output unit 209 into the output history.

<<4. Operational Examples>>

Using FIG. 11 to FIG. 16, operations of the gesture detection system 1 will be described according to the first embodiment of the present invention. An example illustrated in FIG. 11 to FIG. 16 will be described with respect to a registration process to associate detection data detected in response to a user's gesture, with output data input by a recording, and an output process to identify a user's gesture to output the output data having associated with the identified gesture. In the example illustrated in FIG. 11 to FIG. 16, the threshold data 233 and the application data 235 are not used. Therefore, in the example illustrated in FIG. 11 to FIG. 16, the threshold data read unit 254 and the threshold comparison unit 255 of the comparison unit 207, and the application data update unit 210 are not used.

<<Registration Process>>

Figure 11:
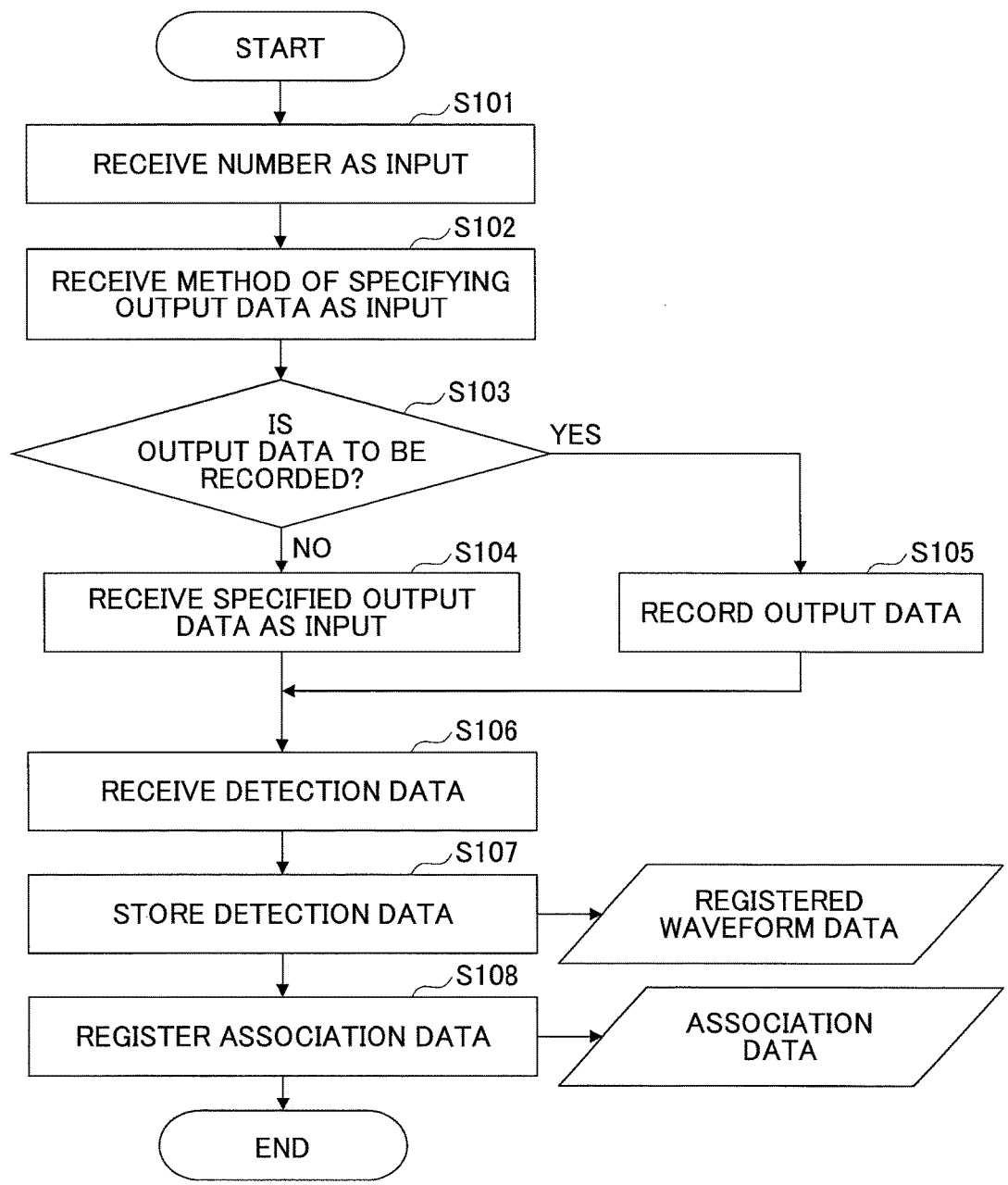
FIG. 11 is a flowchart of a registration process.

Using FIG. 11, a registration process executed by the gesture detection system 1 will be described. The registration process illustrated in FIG. 11 is executed after the gesture detection apparatus 10 has been connected with the mobile communication terminal 20 by wireless communication, and a user has given a command to the mobile communication terminal 20 to execute a registration process. Namely, the registration process is executed after the function implemented on the mobile communication terminal 20 has been switched to the registration function by the switching unit 204 of the mobile communication terminal 20 described above.

First, the input reception unit 203 receives a number to be attached to detection data to be detected in response to a gesture to be registered, as input from the user (Step S101). Next, the input reception unit 203 receives a selection of a method to specify output data (selected among those provided in advance or one that is to be newly recorded) (Step S102). Here, if the output data is to be newly recorded (YES at Step S103), the recording unit 206 records a new sound (Step S105). On the other hand, if it is to be selected among those provided in advance (NO at Step S103), the input reception unit 203 receives the output data selected by the user in a list of the output data displayed on the display 24 (Step S104).

After that, the registration unit 205 prompts the user to perform a gesture to be registered through the display 24 or the loudspeaker 25. In response to the user's gesture, the registration unit 205 receives the detection data detected by the detection unit 101 of the gesture detection apparatus 10 (Step S106). Next, the registration unit 205 associates the received detection data with the number received at Step S101 to store the association in the storage unit 201 as the registered waveform data (Step S107). Then, the registration unit 205 adds a new entry in the table (FIG. 8) as the association data 231-1 that has the number received at Step S101 and the filename of the output data selected or recorded (Step S108).

<<Output Process>>

Figure 12:
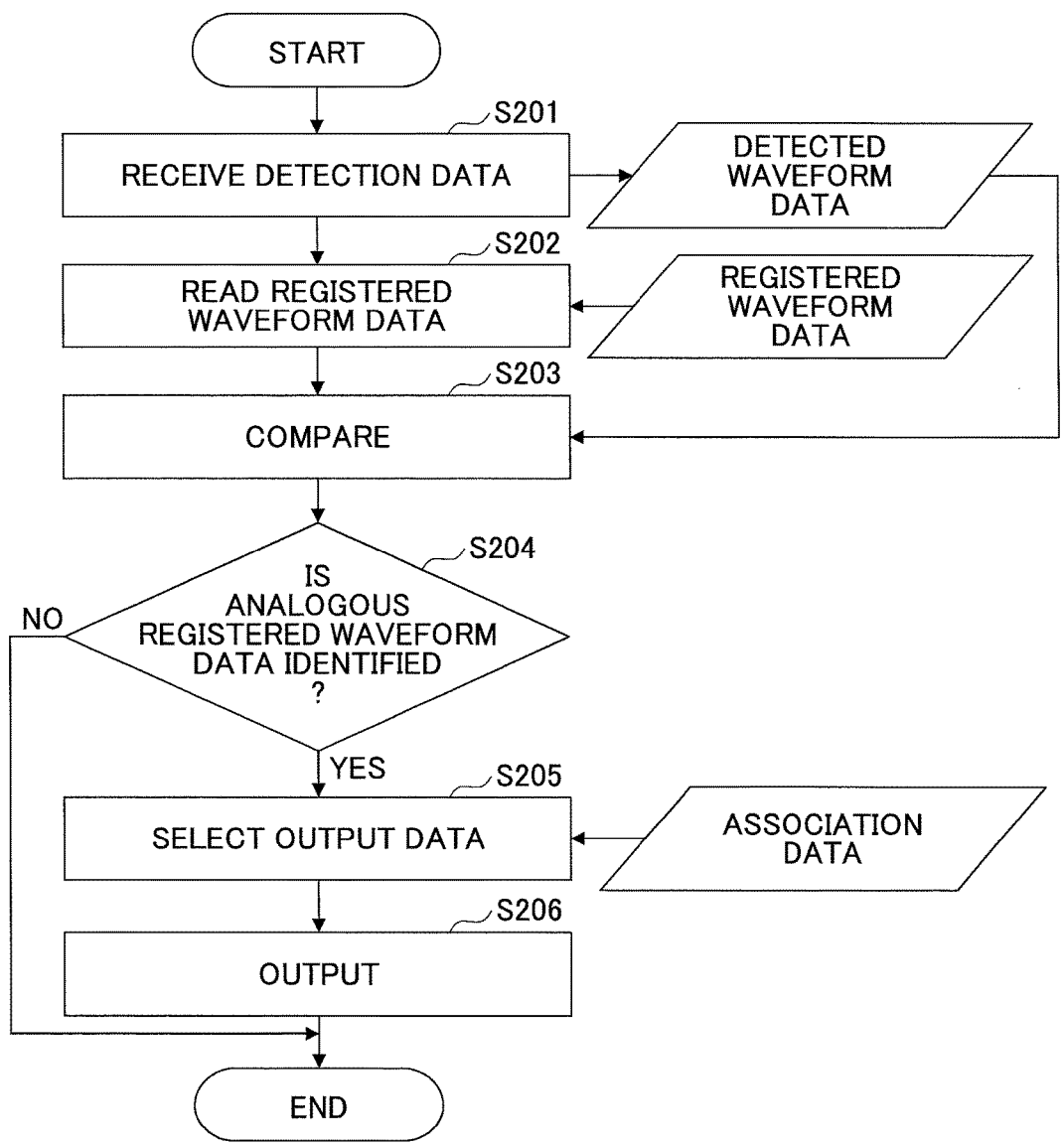
FIG. 12 is a flowchart of an output process.

Using FIG. 12, an output process executed by the gesture detection system 1 will be described. The output process illustrated in FIG. 12 is executed after the gesture detection apparatus 10 has been connected with the mobile communication terminal 20 by wireless communication, and a user has given a command to the mobile communication terminal 20 to execute an output process. Namely, the output process is executed after the function implemented on the mobile communication terminal 20 has been switched to the output function by the switching unit 204 of the mobile communication terminal 20 described above. Assume that at the moment when the output process is to be executed, the user has the gesture detection apparatus 10 attached, to be in a state where he/she can operate a toy 40.

First, the comparison unit 207 (the detection data obtainment unit 251) receives detection data transmitted from the gesture detection apparatus 10 through the communication unit 202 (Step S201). Next, the comparison unit 207 (the registered waveform data read unit 252) reads the registered waveform data 232 stored in the storage unit 201 (Step S202). Next, the comparison unit 207 (the waveform comparison unit 253) compares the detection data with the registered waveform data 232 by executing pattern matching (Step S203). Then, if the comparison unit 207 can identify analogous registered waveform data (YES at Step S204), the selection unit 208 refers to the association data 231, and selects the output data associated with the registered waveform number of the identified registered waveform data (Step S205). Further, the output unit 209 outputs the output data selected at Step S205 (Step S206). On the other hand, if the comparison unit 207 cannot identify analogous registered waveform data (NO at Step S204), the process ends without outputting the output data. Note that the above process is repeatedly executed while the user operates the toy 40.

<<Specific Example of Registration Process>>

Figure 13:
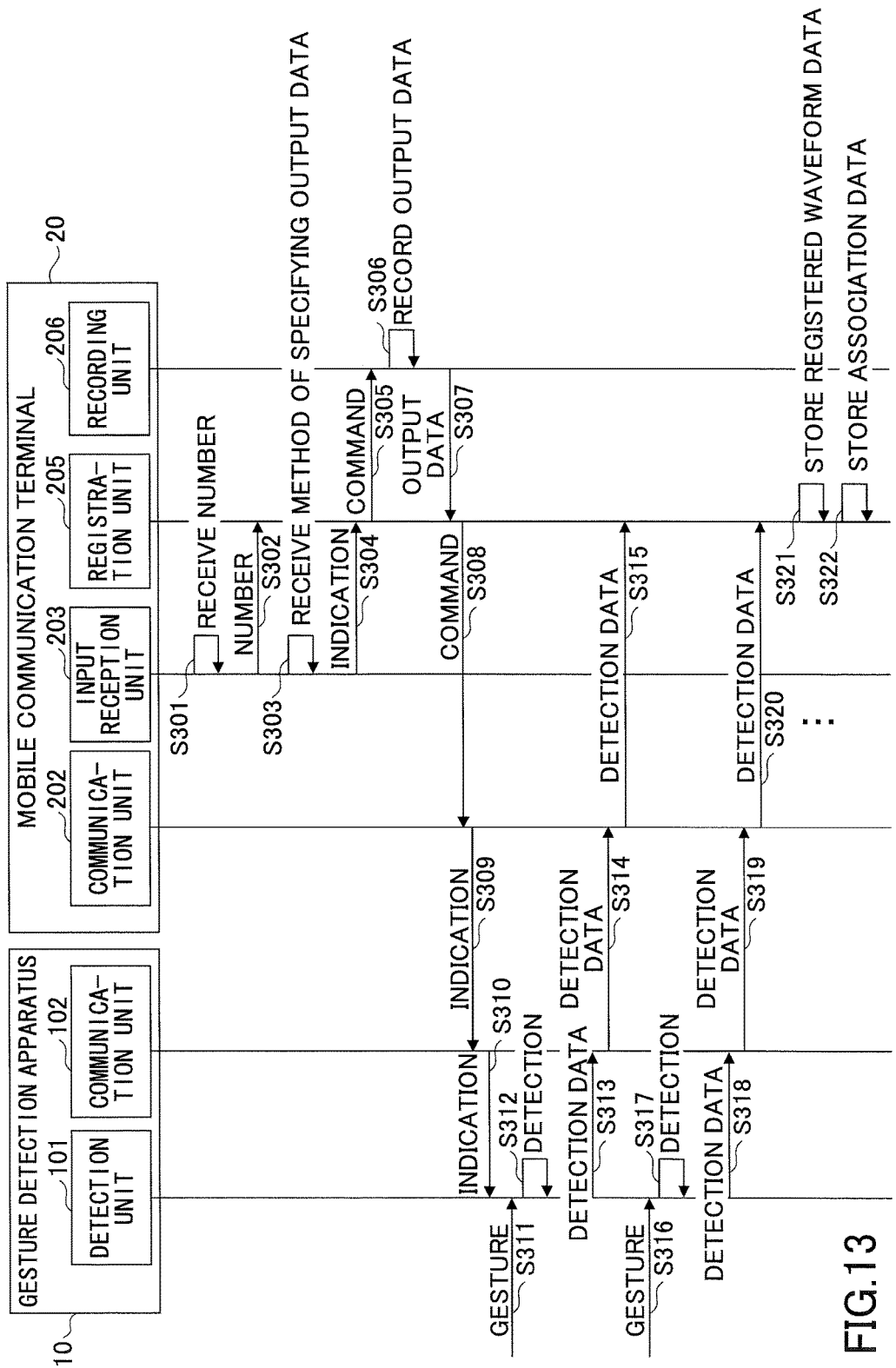
FIG. 13 is a sequence chart representing a specific example of a registration process.

Using FIG. 13, a registration process executed by the gesture detection system 1 will be specifically described. Assume that no association data is registered in the table illustrated in FIG. 8 in the following description.

First, the input reception unit 203 receives a number "1" as input from a user, which is to be attached to detection data to be detected in response to a gesture to be registered (Step S301). The input reception unit 203 transfers the received number "1" to the registration unit 205 (Step S302). Next, the input reception unit 203 receives a selection input from the user to newly record output data (Step S303). The input reception unit 203 indicates to the registration unit 205 that the selection has been made to newly record the output data (Step S304). The registration unit 205 issues a command to start recording the output data to the recording unit 206 (Step S305). The recording unit 206 prompts the user to input a sound by indicating with a sound or a image, and executes the recording (Step S306). The recording unit 206 stores the recorded data in the storage unit 201 as the output data 234, and indicates its filename "userdata_001.aac" to the registration unit 205 (Step S307).

Having completed the recording of the output data, the registration unit 205 issues a command to the communication unit 202 to transmit an indication that it is ready to receive detection data to be detected in response to a user's gesture (Step S308). The communication unit 202 transmits the indication to the communication unit 102 of the gesture detection apparatus 10 (Step S309). The communication unit 102 transfers the received indication to the detection unit 101 (Step S310). At this moment, the registration unit 205 may concurrently prompt the user to perform a gesture to be registered through the display 24 or the loudspeaker 25.

The user performs a gesture of operating the toy 40 (Step S311). The detection unit 101 detects triaxial acceleration data applied to the detection unit 101 in response to the user's gesture (Step S312). The detection unit 101 transfers the detected triaxial acceleration data to the communication unit 102 as the detection data (Step 313). The communication unit 102 transmits the detection data to the communication unit 202 of the mobile communication terminal 20 (Step S314). The communication unit 202 transfers the received detection data to the registration unit 205 (Step S315).

If the user further continues to perform gestures, the registration unit 205 receives the detection data in the same way as done at Steps S311 to S315 (Step S316 to S320). Then, steps are repeated in the same way as done at Steps S316 to S320 for a predetermined number of times. The waveform data illustrated in FIG. 7A represents detection data received during a certain period in this way. The registration unit 205 stores the detection data received during the certain period as the registered waveform data 232 that is associated with the number "1" input at Step S301 (Step S321). Then, the registration unit 205 adds the association data 231-1 into the table (FIG. 8) that has the number "1" input at Step S301 as the registered waveform number, and the filename of the output data "userdata_001.aac" recorded at Step S306 (Step S322).

<<Specific Example of Output process>>

Figure 14A:
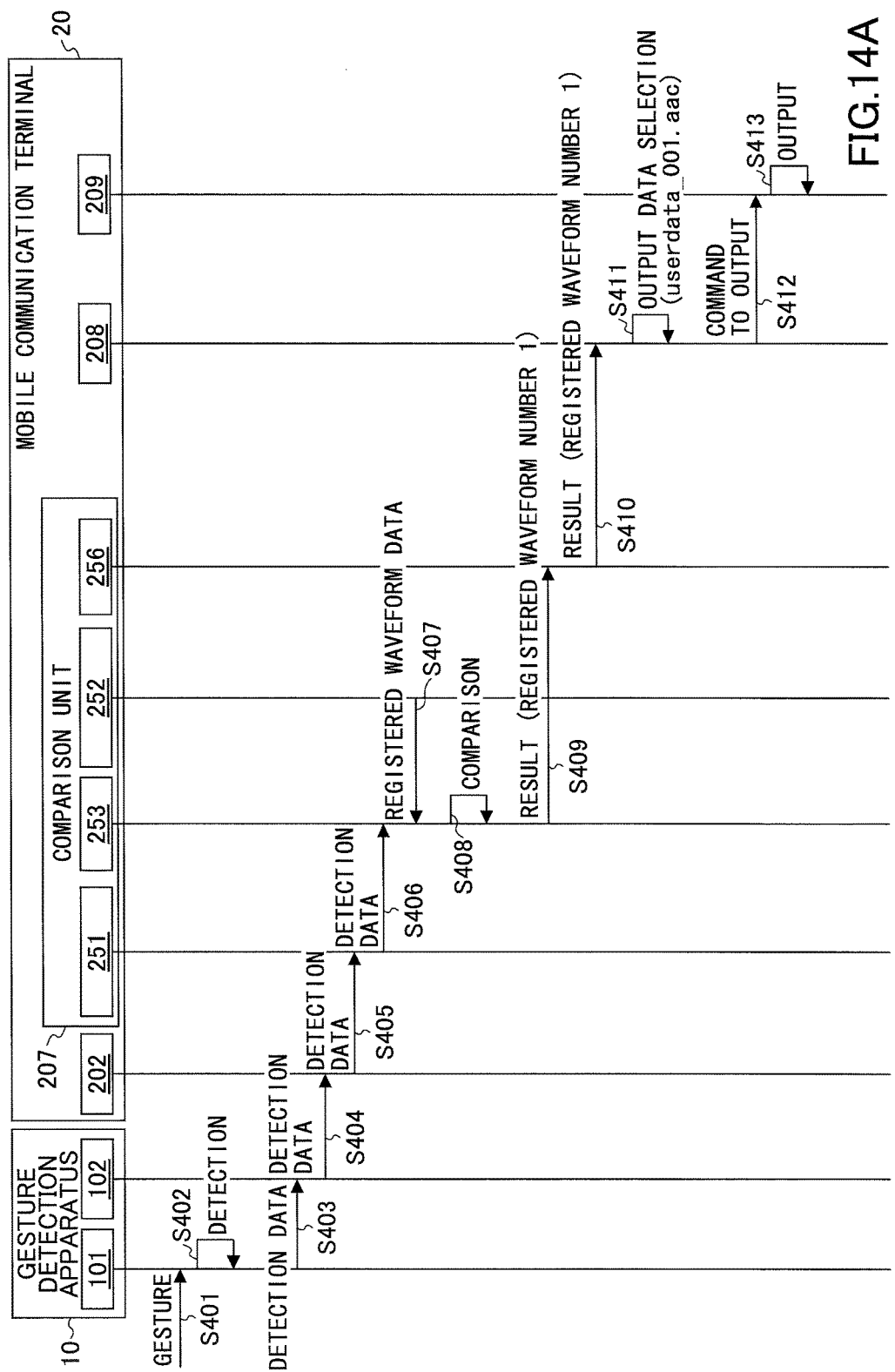
Figure 15A:
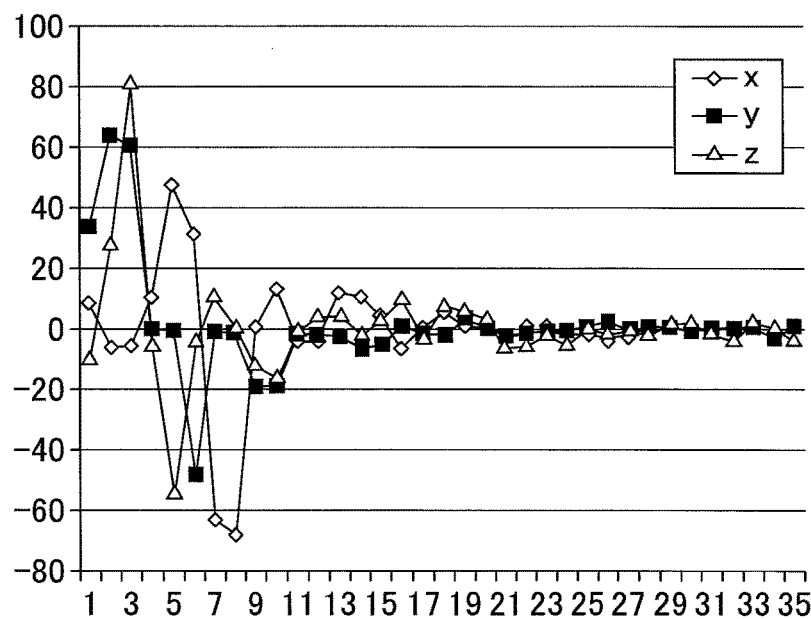
FIGS. 15A-15F are diagrams illustrating examples of waveforms of detection data when a user makes a gesture.
Figure 15B:
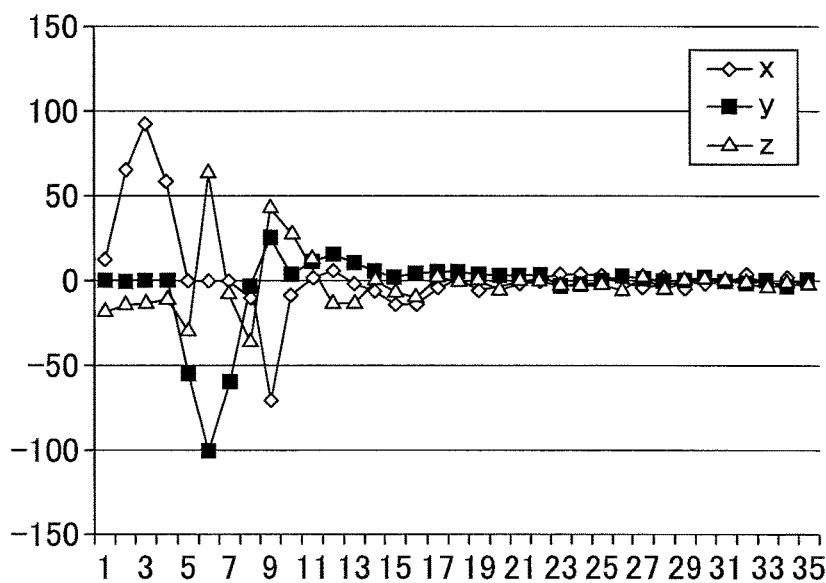
Figure 15C:
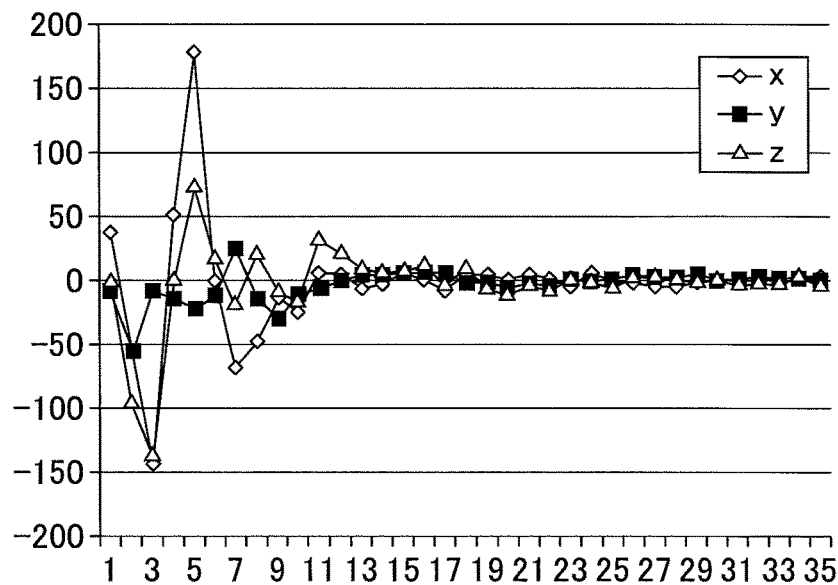

Using FIGS. 14A-14B, an output process executed by the gesture detection system 1 will be specifically described. When the output process in FIGS. 14A-14B is executed, it is assumed that the user has activated one of gesture detection applications on the mobile communication terminal 20. Also, communication has been established between the gesture detection apparatus 10 and the mobile communication terminal 20, and the user can operate the toy 40. Here, the association data 231-1 illustrated in FIG. 8 will be used in the following description. FIGS. 15A-15C are an example of the registered waveform data 232 corresponding to the registered waveform numbers "1" to "3" included in the association data 231-1 in FIG. 8.

First, the user performs a gesture of operating a toy 40 in a state where the user has the gesture detection apparatus 10 attached (Step S401). The detection unit 101 detects triaxial acceleration data applied to the detection unit 101 in response to the user's gesture (Step S402). The detection unit 101 transfers the detected triaxial acceleration data to the communication unit 102 as the detection data (Step S403). The communication unit 102 transmits the detection data to the communication unit 202 of the mobile communication terminal 20 (Step S404). The communication unit 202 transfers the received detection data to the detection data obtainment unit 251 of the comparison unit 207 (Step S405).

Here, the detection data is received from the gesture detection apparatus 10 for multiple times during a certain period. The detection data used for the description here represents a bundle of detection data received during the period.

Figure 15D:
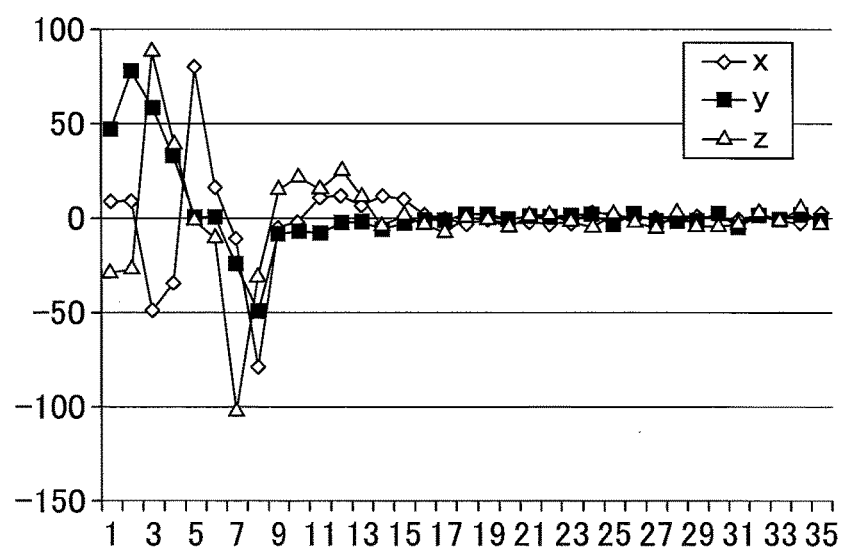

The waveform comparison unit 253 receives the detection data illustrated in FIG. 15D from the detection data obtainment unit 251 (Step S406). Also, the waveform comparison unit 253 receives the registered waveform data (here, waveform data in FIGS. 15A-15C) read by the registered waveform data read unit 252 (Step S407). Then, the waveform comparison unit 253 compares the received detection data with the registered waveform data (Step S408). The waveform comparison unit 253 calculates the distance between the bundles of data, for example, by a method described in Non-Patent Document 1 or 2 to obtain a result in a record of "GESTURE 1" in FIG. 16. Here, the distance between the detection data (FIG. 15D) and the registered waveform number "1" (namely, FIG. 15A) is "720". Similarly, the distance between the detection data and the registered waveform number "2" (FIG. 15B) is "1019", and the distance to the registered waveform number "3" (FIG. 15C)) is "1170". Therefore, the waveform comparison unit 253 transfers the registered waveform number "1", which has the smallest distance with the detection data, to the result output unit 256 as the comparison result (Step S409).

The selection unit 208 receives the registered waveform number "1" from the result output unit 256 of the comparison unit 207 as the comparison result (Step S410). Next, the selection unit 208 refers to the association data 231, and selects output data "userdata_001.aac" corresponding to the registered waveform number "1" as data to be output (Step S411). Next, the selection unit 208 issues a command to the output unit 209 to output the selected output data (Step S412). The output unit 209 outputs "userdata_001.aac" (Step S413).

Figure 15E:
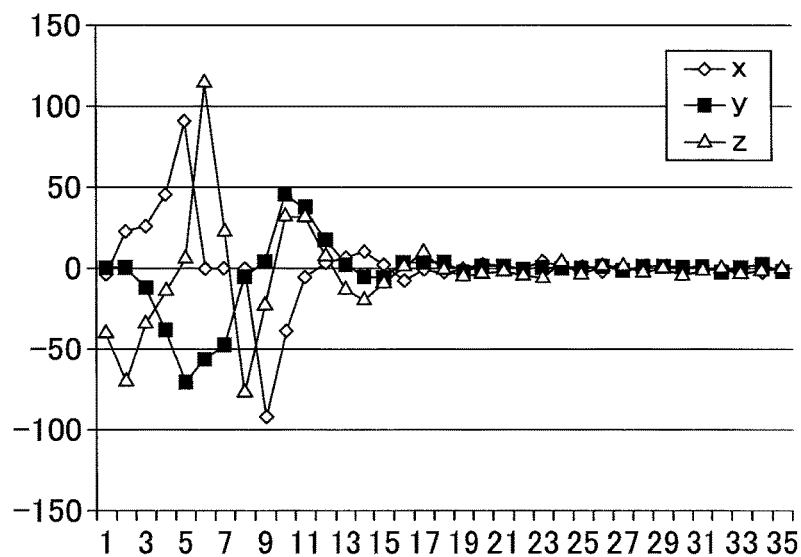

After that, an additional user's gesture make the waveform comparison unit 253 receive the detection data illustrated in FIG. 15E (Step S414 to S419), similarly to Steps S401 to S406 described above. Similarly to Steps S407 and S408 described above, the waveform comparison unit 253 compares the detection data with the registered waveform data, calculates the distance illustrated in a record of "GESTURE 2" in FIG. 16, and identifies the most analogous registered waveform data, which is the registered waveform number "2" (Steps S420 and S421). Then, similarly to Steps S409 to S413 described above, the output unit 209 outputs data "preset_001.wav" corresponding to the registered waveform number "2" (Steps S422 to S426).

Figure 15F:
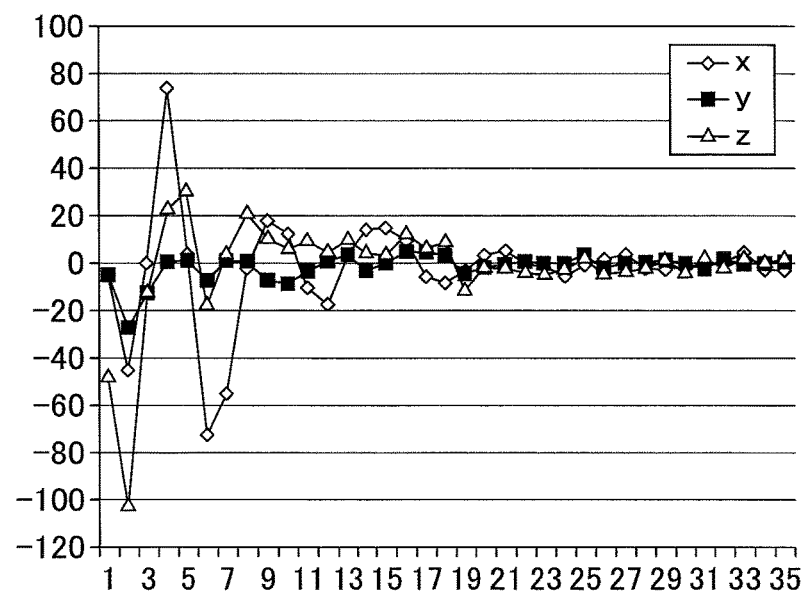

After that, until the user gives a command to end the gesture detection application, the above process is similarly repeated, and the output data corresponding to a user's gesture is output from the mobile communication terminal 20. For example, if detection data illustrated in FIG. 15F is detected, it has distances with the respective registered waveform data in FIGS. 15A-15C as illustrated in a record of "GESTURE 3" in FIG. 16. Consequently, output data "preset_002.wav" associated with the registered waveform number "3" is output.

Thus, according to the present embodiment, a user can make the mobile communication terminal 20 output a sound corresponding to a gesture, by having the gesture detection apparatus 10 attached to an existing toy 40, and performing the predetermined gesture. Also, the user can register a desired gesture and a desired sound by using the registration function. Consequently, the user can experience a play with reality using the existing toy 40.

<<Example Using Threshold Data/Application Data>>

In the example in FIG. 11 to FIG. 16, a case is described where the threshold data 233 and the application data 235 are not used. Namely, a case is described where the threshold data read unit 254 and the threshold comparison unit 255 of the comparison unit 207, and the application data update unit 210 are not used. On the other hand, in the following, using FIG. 17 to FIG. 19, an example will be described where the threshold data 233 and application data 235 are used, and the threshold data read unit 254 and the threshold comparison unit 255 of the comparison unit 207, and the application data update unit 210 are also used.

Figure 17:
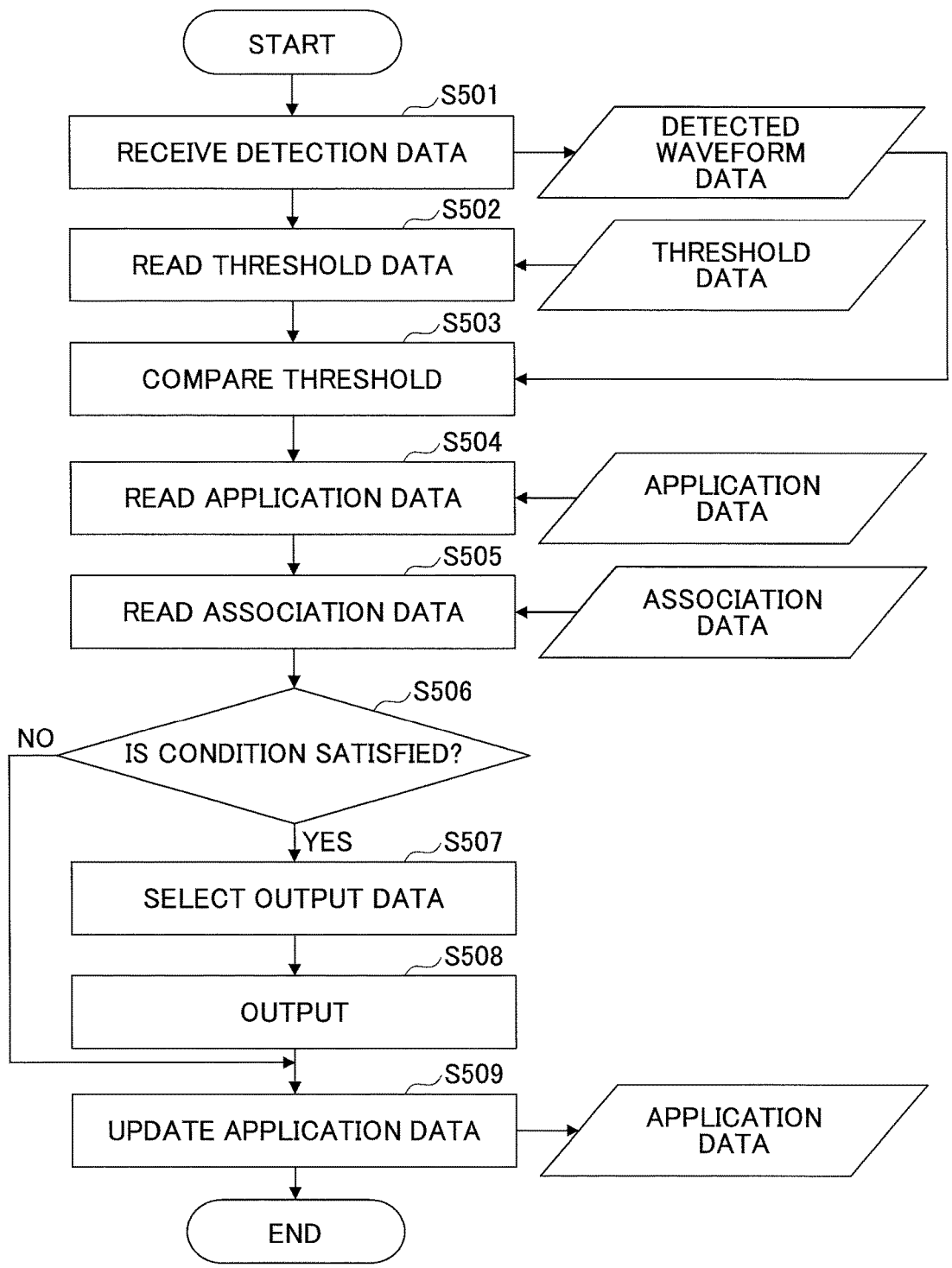
FIG. 17 is a flowchart of an output process.

Using FIG. 17, an output process executed by the gesture detection system 1 will be described where the threshold data 233 and application data 235 are used. Similarly to the output process described using FIG. 12, the output process illustrated in FIG. 17 is executed after the gesture detection apparatus 10 has been connected with the mobile communication terminal 20 by wireless communication, and a user has given a command to the mobile communication terminal 20 to execute the output process. Namely, the output process is executed after the function implemented on the mobile communication terminal 20 has been switched to the output function by the switching unit 204 of the mobile communication terminal 20 described above. Note that when the output process is to be executed, the user has the gesture detection apparatus 10 attached, to be in a state where the user can operate a toy 40.

First, the comparison unit 207 (the detection data obtainment unit 251) receives detection data transmitted from the gesture detection apparatus 10 through the communication unit 202 (Step S501). Next, the threshold data read unit 254 reads the threshold data 233 (for example, thresholds A, B, and C of the respective axes) (Step S502). Next, the threshold comparison unit 255 compares maximum values of acceleration data for the axis directions included in the detection data obtained by the detection data obtainment unit 251 (for example, FIG. 7B) with the thresholds A, B, and C of the respective axes in the threshold data 233 read by the threshold data read unit 254.

Next, the selection unit 208 reads application data 235 stored in the storage unit 201 (Step S504). Next, the selection unit 208 reads the association data 231-2 or 231-3 (Step S505), and then, if conditions (threshold condition and application data condition) are satisfied (YES at Step S506), selects output data corresponding to the satisfied conditions (Step S507). Then, the output unit 209 outputs the output data selected at Step S507 (Step S508).

After Step S508, or if the conditions are not satisfied at Step S506, the application data update unit 210 updates the application data 235 if necessary (Step S509).

Note that the above process may be repeatedly executed while the user operates the toy 40 similarly to the process described using FIG. 12.

<<Example Using Flag Set Effective Depending On Predetermined Operation>>

Using FIGS. 18A-18B, a specific example of an output process will be described that uses the threshold data 233 and application data 235. Here, a flag is used as the application data 235, which is set effective depending on a predetermined gesture. At first, the flag is set off. Similarly to the process described using FIG. 14, it is assumed that the user has activated one of gesture detection applications on the mobile communication terminal. Also, communication has been established between the gesture detection apparatus 10 and the mobile communication terminal 20, and the user can operate the toy 40.

First, Steps S601 to S605 are the same as Steps S401 to S405 in FIG. 14 with which detection data detected by the gesture detection apparatus 10 in response to a user's gesture is obtained by the detection data obtainment unit 251 of the mobile communication terminal 20. The threshold comparison unit 255 receives the detection data from the detection data obtainment unit 251 (Step S606). Also, the threshold comparison unit 255 receives the threshold data (here, thresholds A, B, and C for acceleration data in respective axis directions included in the detection data) read by the threshold data read unit 254 (Step S607). Then, the threshold comparison unit 255 compares maximum values in the axis directions with the thresholds A, B, and C, respectively (Step S608). Here, assume that the maximum value in X axis direction of the acceleration data is greater than the threshold A, and the maximum values in Y and Z axis directions of the acceleration data is less than the thresholds B and C, respectively. The threshold comparison unit 255 transfers the comparison result (X>A) to the result output unit 256 (Step S609).

The selection unit 208 receives the comparison result "X>A" from the result output unit 256 of the comparison unit 207 (Step S610). Next, the selection unit 208 reads the application data 235 (flag) stored in the storage unit 201 (Step S611). Here, assume that the flag is "OFF". Then, the selection unit 208 refers to the association data 231-2 (FIG. 9), and selects output data "ignition.mp3" corresponding to the condition (threshold) "X>A" and the condition (application data) "flag OFF" as data to be output (Step S612). Next, the selection unit 208 issues a command to the output unit 209 to output the selected output data (Step S613). The output unit 209 outputs "ignition.mp3" (Step S614).

Moreover, the application data update unit 210 receives the comparison result "X>A" and the application data "flag OFF" from the selection unit 208 (Step S615). Then, the application data update unit 210 updates the application data 235 stored in the storage unit 201 to "flag ON" (Step S616). Here, assume that the application data update unit 210 executes an update process to set the application data 235 to "flag ON" only if the comparison result is "X>A", and "flag OFF" is received as the application data 235.

After that, an additional user's gesture makes the threshold comparison unit 255 receive detection data (S617 to S622), similarly to Steps S601 to S606 described above. Similarly to Steps S607 and S608 described above, the threshold comparison unit 255 compares maximum values in the axis directions included in the detection data with the thresholds A, B, and C, respectively (Steps S623 and S624). Then, similarly to Steps S609 and S610 described above, the comparison result is transferred to the selection unit 208 (Steps S625 and S626). Assume here that the comparison result is "X>A and Y>B".

Next, the selection unit 208 reads "flag ON" as the application data 235 stored in the storage unit 201 (Step S627). The selection unit 208 refers to the association data 231-2 (FIG. 9), and selects output data "drift.mp3" corresponding to the condition (threshold) "X>A and Y>B" and the condition (application data) "flag ON" as data to be output (Step S628). Next, the selection unit 208 issues a command to the output unit 209 to output the selected output data (Step S629). The output unit 209 outputs "drift.mp3" (Step S630).

Moreover, the application data update unit 210 receives the comparison result "X>A and Y>B" and the application data 235 "flag ON" from the selection unit 208 (Step S631). Here, the application data update unit 210 does not update the application data 235.

Thus, by having the gesture detection apparatus 10 attached to, for example, a toy passenger car, and by operating the toy, a user can enjoy sounds corresponding to operations of a real passenger car, using the mobile communication terminal 20 according to the present embodiment.

Note that, in the above operational example, the positive direction in X-axis corresponds to the traveling direction of the passenger car, the positive direction in Y-axis corresponds to the right hand direction of the passenger car, and the positive direction in Z-axis corresponds to the vertically upward direction of the passenger car. Namely, if the passenger car is moved forward when it is "flag OFF" (state of ignition off), as illustrated in the association data 231-2 in FIG. 9, a sound of the ignition on or "ignition.mp3" is output. Moreover, if a gesture is detected in the left or right direction while the ignition is on, a drift sound or "drift.mp3" is output, and if a gesture is detected in an upward or downward direction, a crash sound or "crash.mp3" is output. Also, after the crash, the application data update unit 210 turns off the flag.

<<Example Using History of Output Data>>

Using FIGS. 19A-19B, another specific example of an output process will be described that uses the threshold data 233 and application data 235. Here, an output history of output data output by the mobile communication terminal 20 will be used as the application data 235. Similarly to the examples described using FIGS. 14A-14B and FIGS. 18A-18B, assume that a user has activated one of gesture detection applications on the mobile communication terminal 20. Also, communication has been established between the gesture detection apparatus 10 and the mobile communication terminal 20, and the user can operate the toy 40.

Figure 18B:
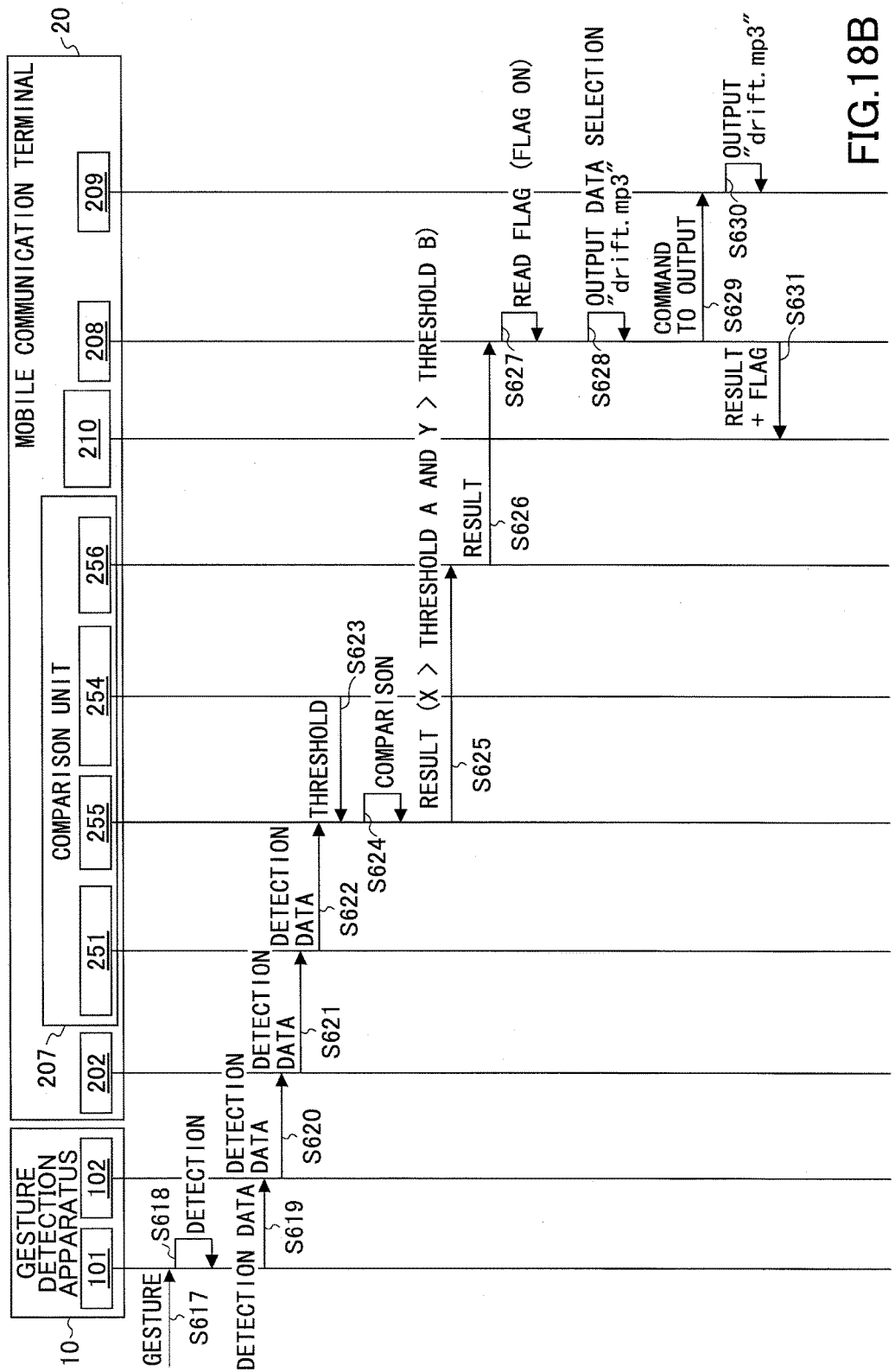
Figure 19A:
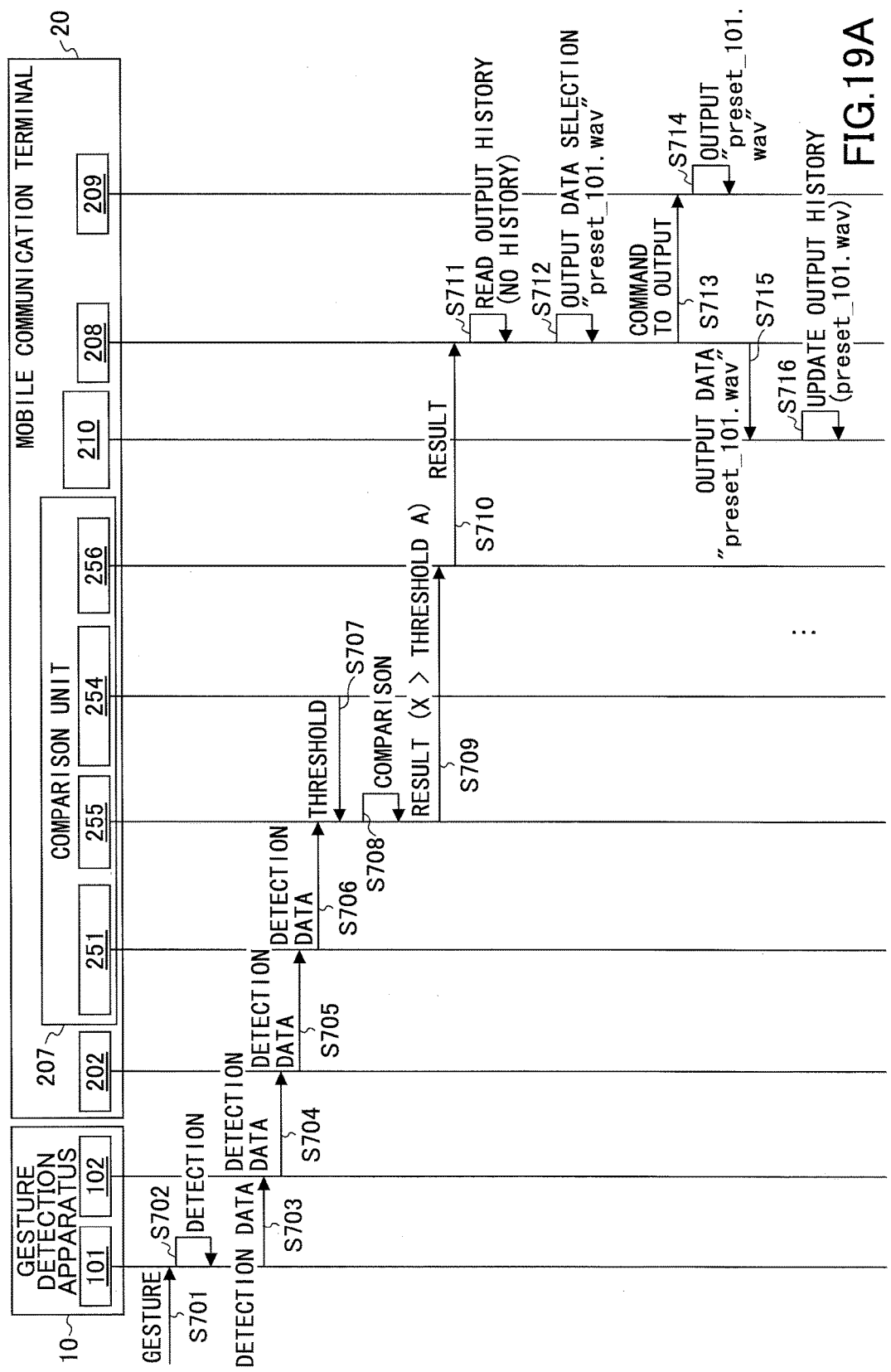

First, Steps S701 to S710 are the same as Steps S601 to S610 in FIG. 18A with which the mobile communication terminal 20 receives detection data detected by the gesture detection apparatus 10, compares it with the threshold, and transfers the comparison result to the selection unit 208. Assume that the same comparison result is obtained by the threshold comparison unit 255 as in the example described using FIGS. 18A-18B, which is "X>A". Next, the selection unit 208 reads the application data 235 (output history) stored in the storage unit 201 (Step S711). Assume that the output history is empty (no output history). The selection unit 208 refers to the association data 231-3 (FIG. 10), and selects output data "preset_101.wav" corresponding to the condition (threshold) "X>A" and the condition (output history) "NO HISTORY" as data to be output (Step S712). Next, the selection unit 208 issues a command to the output unit 209 to output the selected output data (Step S713). The output unit 209 outputs "preset_101.wav" (Step S714).

Next, the application data update unit 210 receives the filename "preset_101.wav" of the selected output data from the selection unit 208 (Step S715). Then, the application data update unit 210 records "preset_101.wav" as an output history in the application data 235 stored in the storage unit 201 (Step S716).

After that, additional user's gestures make the same process repeated as done at Steps S701 to S716 described above, and "preset_101.wav->preset_102.wav->preset_103.wav" are recorded as the output history in the application data 235.

Similarly to Step S701s to S708 described above, when receiving the detection data, the threshold comparison unit 255 compares maximum values in the axis directions included in the detection data with the thresholds A, B, and C, respectively (Steps S717 to S724). Then, similarly to Steps S709 and S710 described above, the comparison result is transferred to the selection unit 208 (Steps S725 and S726). Assume here that the comparison result is "X>A and Y>B and Z>C".

Next, the selection unit 208 reads the output history "preset_101.wav->preset_102.wav->preset_103.wav" as the application data 235 stored in the storage unit 201 (Step S727). The selection unit 208 refers to the association data 231-3 (FIG. 10). Then, the selection unit 208 selects the output data "preset_103.wav" and "preset_special.wav" corresponding to the condition (output history) "preset_101.wav->preset_102.wav->preset_103.wav" as data to be output (Step S728). Next, the selection unit 208 issues a command to the output unit 209 to output the selected output data (Step S729). The output unit 209 outputs "preset_103.wav", then outputs "preset_special.wav" (Step S730).

Next, the application data update unit 210 receives the filenames "preset_103.wav" and "preset_special.wav" of the selected output data from the selection unit 208 (Step S731). Then, the application data update unit 210 records "NO HISTORY" as the output history in the application data 235 stored in the storage unit 201 (Step S732).

Thus, a user can enjoy sounds output through the mobile communication terminal 20 according to the present embodiment, by having the gesture detection apparatus 10 attached to, for example, an arbitrary toy 40 or the user's arm, and by operating the toy freely. In the above example using the output history, specifically provided sounds are output only if gestures are performed with the toy 40 in predetermined order.

<<5. Application Example>>

Cases described above include the example where a predetermined sound is output when detection data is matched with waveform data registered in advance (FIGS. 14A-14B); and the example where a predetermined sound is output when a predetermined condition of detection data, such as maximum values or application data, is satisfied (FIGS. 18A-18B or FIGS. 19A-19B). However, the present invention is not limited to these examples, but a predetermined sound may be output when, for example, detection data is matched with waveform data registered in advance, and another condition (for example, thresholds or application data) is satisfied. On the other hand, a predetermined sound may be output by determining detection data only using a threshold condition according to the present invention.

Also, a case is described above using the example where the gesture detection apparatus 10 has the acceleration sensor. However, substantially the same effect can be obtained if the gesture detection apparatus 10 has an optical sensor or a pressure sensor, and uses data representing a change in the amount of light or pressure to execute the process described above according to the present invention.

[Second Embodiment]

In the first embodiment, a configuration of the gesture detection apparatus 10 is described where the type of a user's gesture is identified to switch audio or visual data to be output by using detection data detected by an acceleration sensor built in the gesture detection apparatus 10. However, the present invention is not limited to these examples, but it may be configured so that audio or visual data to be output is switched by further taking, for example, the direction (operational direction) of a user's gesture into account. In the following, a second embodiment will be described in detail. Note that the same elements as in the first embodiment are assigned the same reference numbers, and their description is omitted.

<<1. Overview>>

First, using FIGS. 20A-20B, an overview of the second embodiment will be described. FIGS. 20A-20B are diagrams illustrating examples of use of a gesture detection system 1 according to the second embodiment. In the present embodiment, an example will be described where a function of switching audio or visual data to be output based on the type of a user's gesture and the direction of the user's gesture is realized with performance of an imaginary drum set.

In general, a drum set includes different types of percussion instruments, which are separately disposed in the lateral direction, the depth direction, and the height direction from the user's position. Namely, the user extends his/her arms in the lateral direction, the depth direction, and the height direction, to make motions of "beating" on the respective percussion instruments.

The gesture detection system 1 according to the second embodiment outputs the sound of a percussion instrument from the mobile communication terminal 20 depending on the type of a user's gesture (gesture of beating) and the direction of the user's gesture, even when a real drum set does not exist.

Namely, the gesture detection system 1 according to the second embodiment first determines whether the user's arm extends in one of the directions where respective percussion instruments are placed. Then, if detecting a gesture of beating performed by the user in the direction, it outputs the sound corresponding to the percussion instrument in that direction.

In the example in FIGS. 20A-20B, the user has the gesture detection apparatuses 10 attached on the right wrist part and the left wrist part, respectively. As illustrated in FIG. 20A, the user sits on a chair, and moves the arms having the gesture detection apparatuses 10 attached as if the user beats an actual drum set, which makes the mobile communication terminal 20 output sounds that would be generated when beating the real drum set.

Consequently, as illustrated in FIG. 20B, the user can enjoy a simulated experience of performing the drum set that does not actually exist.

Figure 21A:
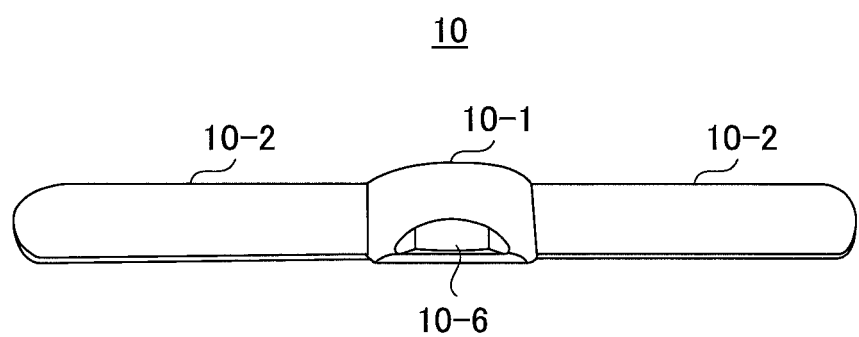
FIGS. 21A-21B are diagrams illustrating appearances of a gesture detection apparatus.
Figure 21B:
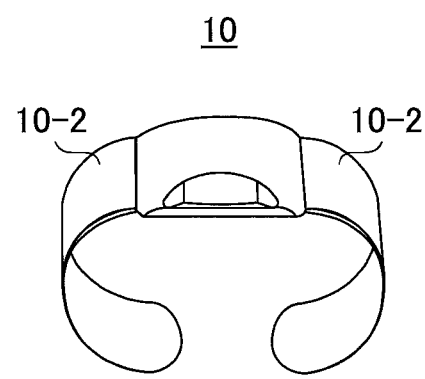

FIGS. 21A-21B are diagrams illustrating appearances of the gesture detection apparatus 10 according to the second embodiment. As illustrated in FIG. 21A, the gesture detection apparatus 10 according to the second embodiment includes a housing 10-1 to have a sensor, a wireless communication apparatus, and the like built in, and a belt 10-2 to attach the gesture detection apparatus 10 to a user's arm or wrist, similarly to the gesture detection apparatus 10 described using FIG. 2A in the first embodiment.

However, in case of the gesture detection apparatus 10 according to the second embodiment, the housing 10-1 has a shape of a wristwatch assuming that a user has it attached on the wrist, and a button 10-6 is provided on the upper surface of the housing 10-1 to issue a command to communicate with the mobile communication terminal 20. Also, the belt 10-2 is a wristband made of silicone, with which a user can attach the gesture detection apparatus 10 on the wrist at his/her fingertips (FIG. 21B).

<<2. Functions>>

Figure 22:
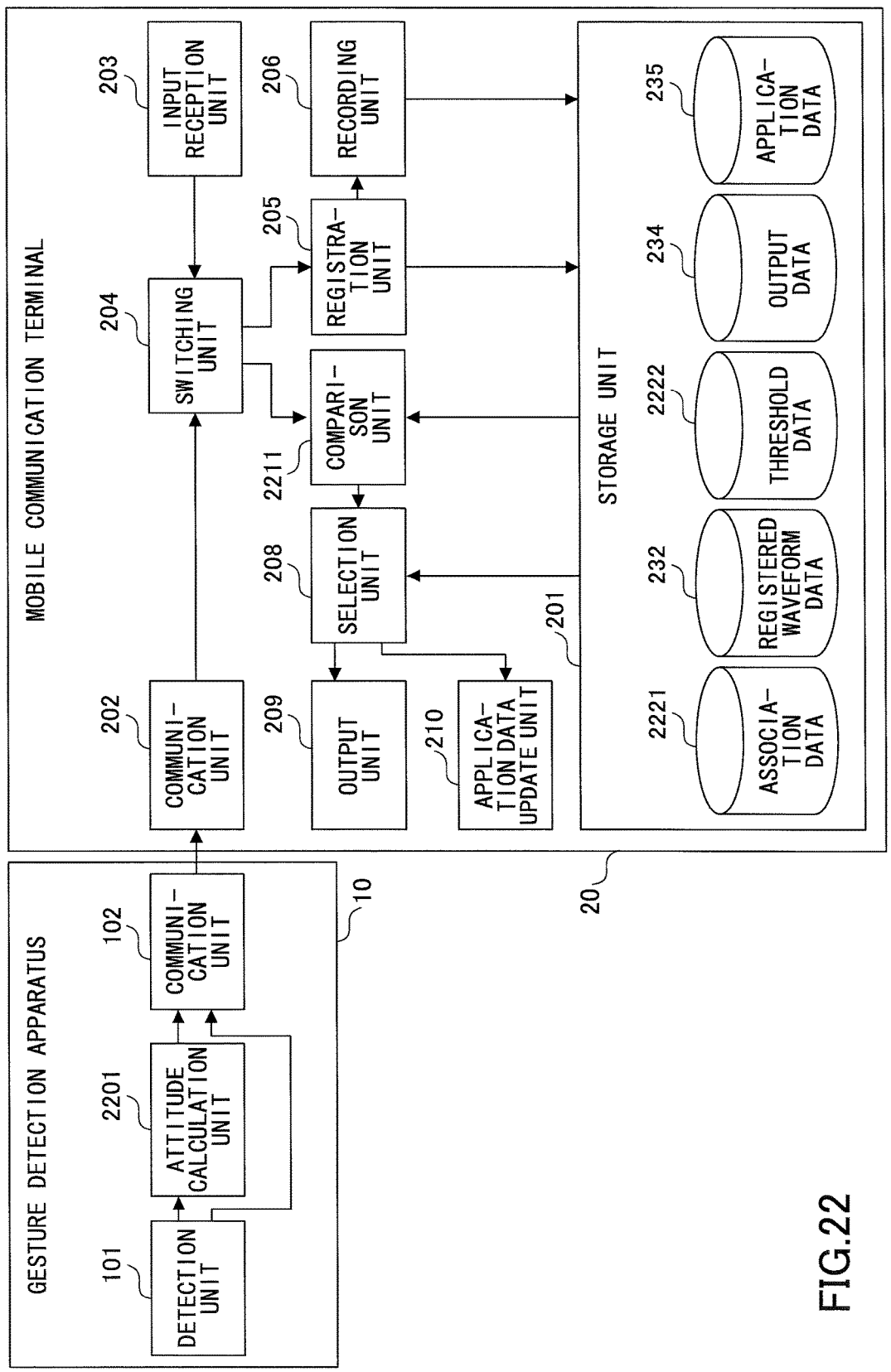
FIG. 22 is a functional block diagram of a gesture detection system.

Next, using FIG. 22 and FIG. 23, functional blocks of the gesture detection system 1 will be described according to the second embodiment. Here, functional blocks different from those in FIG. 5 and FIG. 6 are mainly described.

The functional blocks of the gesture detection apparatus 10 differ from those in first embodiment in that an attitude calculation unit 2201 is included. The attitude calculation unit 2201 calculates a value representing rotation in a 3D-space, called "quaternion", to use it as data representing the attitude of the gesture detection apparatus 10 (attitude data). The attitude calculation unit 2201 receives acceleration data and angular velocity data detected by the detection unit 101 as input, and calculates the attitude data of the gesture detection apparatus 10 one after another using a Kalman filter.

The attitude data calculated by the attitude calculation unit 2201 is transmitted to the mobile communication terminal 20 by the communication unit 102. Note that the communication unit 102 also transmits detection data detected by the detection unit 101 to the mobile communication terminal 20.

The functional blocks of the mobile communication terminal 20 differ from those in first embodiment in terms of the configuration of association data 2221, the configuration of threshold data 2222, and the configuration of a comparison unit 2211.

In the second embodiment, the association data 2221 is data associating a user's gesture and the direction (operational direction) of the user's gesture, with audio or visual data (output data) to be output. The association data 2221 is held in, for example, a table as illustrated in FIG. 24.

As illustrated in FIG. 24, the association data 2221 includes information items of "condition of relative attitude data", "condition of detection data", and "output data". The "condition of relative attitude data" stores a condition for the mobile communication terminal 20 to output the output data with respect to the relative attitude data (as will be described later in detail) calculated based on the attitude data transmitted from the gesture detection apparatus 10 (condition to identify an operational direction). The "condition of detection data" stores a condition for the mobile communication terminal 20 to output the output data with respect to the detection data transmitted from the gesture detection apparatus 10 (condition to identify the type of a gesture).

The "output data" stores output data to be output when the relative attitude data and the detection data satisfy a condition stored in the "condition of relative attitude data" and a condition stored in the "condition of detection data", respectively. Note that although FIG. 24 illustrates a case where the threshold data 2222 is used for identifying the type of a user's gesture, the registered waveform data 232 may be used for identifying the type of a user's gesture. Also, the application data 235 may be further used for selecting the output data. However, in the following, for the sake of explanation, a case will be described where the threshold data 2222 is used.

Figure 25:
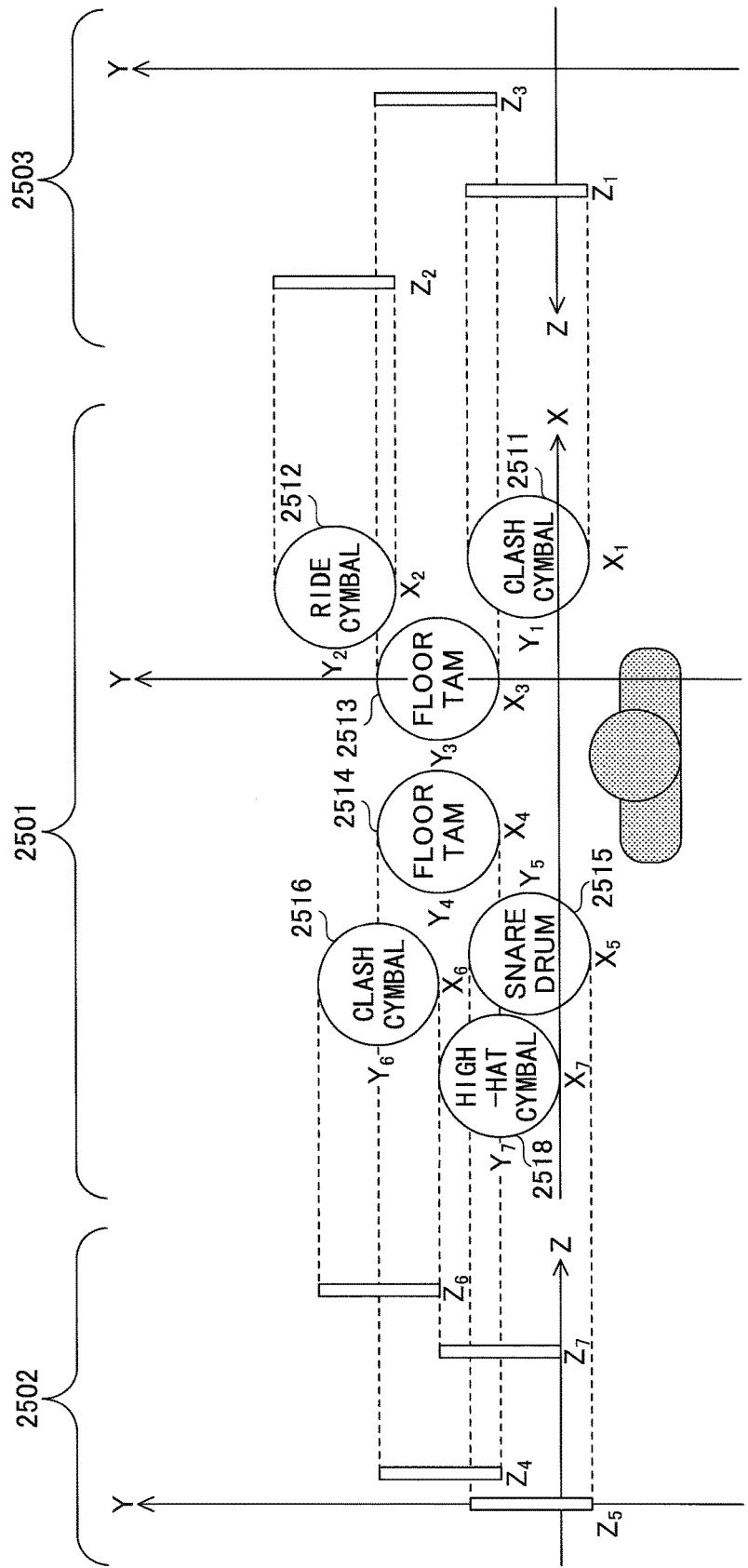
FIG. 25 is a diagram illustrating positions of seven percussion instruments of an imaginary drum set.

Note that the second embodiment assumes an imaginary drum set to play with includes seven percussion instruments. Therefore, seven separate "conditions of relative attitude data" are specified. FIG. 25 is a diagram illustrating positions of the seven percussion instruments of the imaginary drum set.

In FIG. 25, a plane placement view 2501 is a view of positions of the seven percussion instruments constituting the imaginary drum set when viewed from the above. Also, a side placement view 2502 is a view of positions of four percussion instruments on the left hand side of a user when viewed from the left, among the seven percussion instruments constituting the imaginary drum set. Furthermore, another side placement view 2503 is a view of positions of three percussion instruments on the right hand side of the user when viewed from the right, among the seven percussion instruments constituting the imaginary drum set.

As illustrated in the plane placement view 2501, the seven percussion instruments include a clash cymbal 2511, a ride cymbal 2512, a floor tam 2513, a floor tam 2514, a snare drum 2515, a clash cymbal 2516, and a high-hat cymbal.

The center position coordinates of the seven percussion instruments are:
Clash cymbal $2511=(X_1, Y_1, Z_1)$;
Ride cymbal $2512=(X_2, Y_2, Z_2)$;
Floor tam $2513=(X_3, Y_3, Z_3)$;
Floor tam $2514=(X_4, Y_4, Z_4)$;
Snare drum $2515=(X_5, Y_5, Z_5)$;
Clash cymbal $2516=(X_6, Y_6, Z_6)$; and
High-hat cymbal $2518=(X_7, Y_7, Z_7)$, respectively. The "condition of relative attitude data" specified in the association data 2221 defines ranges of operational directions to include these center position coordinates of the seven percussion instruments (namely, thresholds Q0 to Q7).

Referring to FIG. 22 again, the threshold data 2222 holds thresholds A, B, and C as thresholds to identify the type of a user's gesture, and holds the thresholds Q0 to Q7 as thresholds to identify the operational direction of the user's gesture.

Using the relative attitude data and the thresholds Q0 to Q7, the comparison unit 2211 determines whether a user's gesture direction is a predetermined operational direction. If determining that the user's gesture direction is a predetermined operational direction, the comparison unit 2211 compares, for example, the detection data received from the gesture detection apparatus 10 with the threshold, and transfers a comparison result to the selection unit 208.

Figure 23:
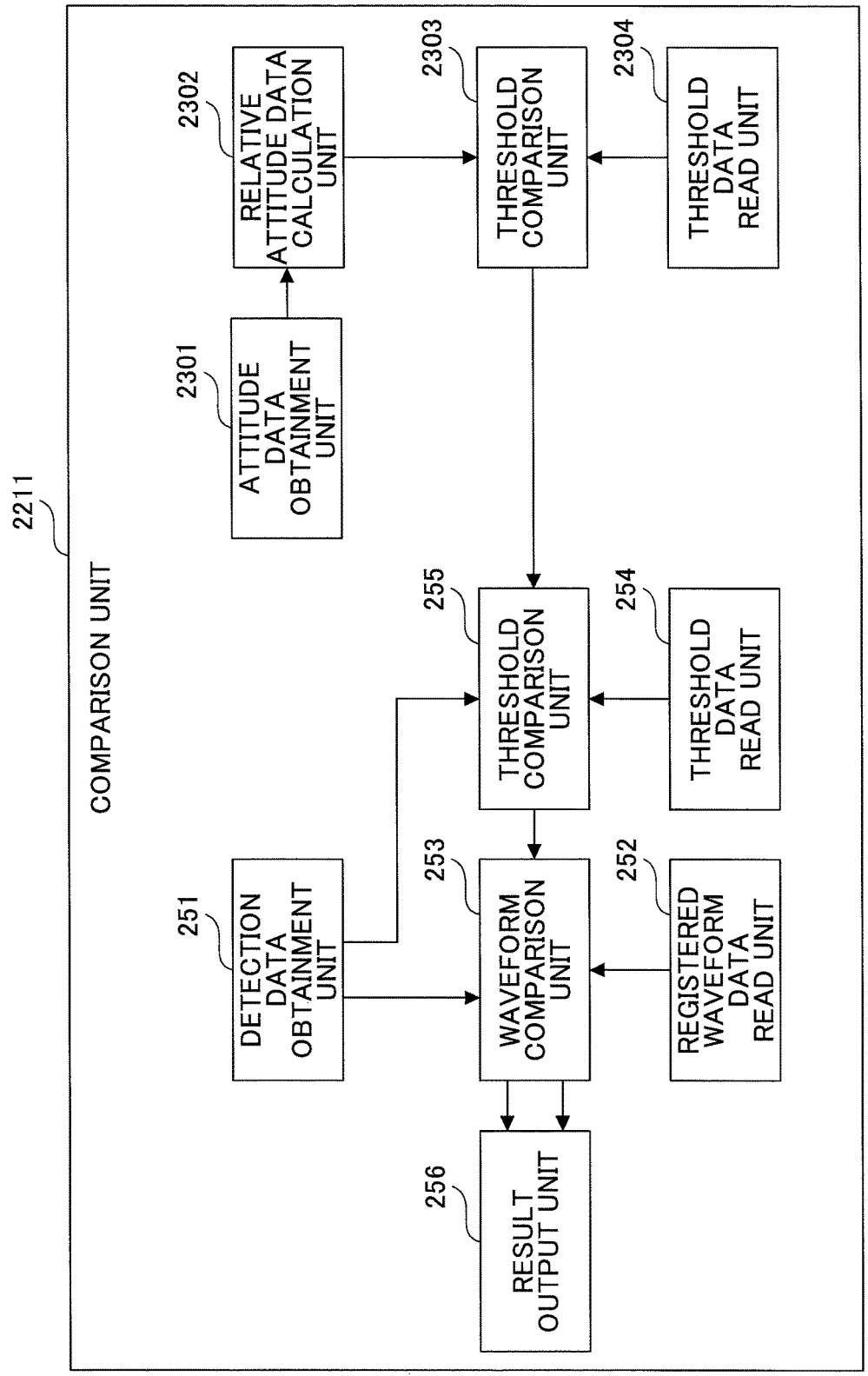
FIG. 23 is a detailed functional block diagram of a gesture detection system.

FIG. 23 is a detailed functional block diagram of the comparison unit 2211. Note that it differs from the comparison unit 207 illustrated in FIG. 6 in that FIG. 23 includes an attitude data obtainment unit 2301, a relative attitude data calculation unit 2302, a threshold comparison unit 2303, and a threshold data read unit 2304.

The attitude data obtainment unit 2301 obtains attitude data received from the gesture detection apparatus 10. The relative attitude data calculation unit 2302 outputs relative attitude data (relative angle) Q by calculating a difference between the obtained attitude data and a reference direction. The relative attitude data (relative angle) Q represents the operational direction in which the user's gesture is performed.

The threshold data read unit 2304 reads the threshold data 2222 stored in the storage unit 201. The threshold comparison unit 2303 compares the relative attitude data (relative angle) Q calculated by the relative attitude data calculation unit 2302, with the threshold data 2222 (Q0 to Q7) read by the threshold data read unit 2304. Based on the comparison result, if the threshold comparison unit 2303 determines that the relative attitude data Q calculated by the relative attitude data calculation unit 2302 satisfies the "condition of relative attitude data" specified in the threshold data 2222, the threshold comparison unit 2303 indicates to the threshold comparison unit 255 which condition is satisfied.

The threshold comparison unit 255, the result output unit 256 and the like execute a process when receiving the indication from the threshold comparison unit 2303. Note that contents of the process executed by the threshold comparison unit 255, the result output unit 256 and the like have been already described, and their description is omitted here.

<<3. Operational Example>>

Next, using FIG. 26 to FIG. 31B, a process will be described that is executed by the gesture detection system 1 according to the second embodiment. Specifically, a preprocess for a user to experience a performance of the imaginary drum set, and a performance process for the user to experience the performance of the imaginary drum set will be described.

<<Preprocess>>

Figure 26:
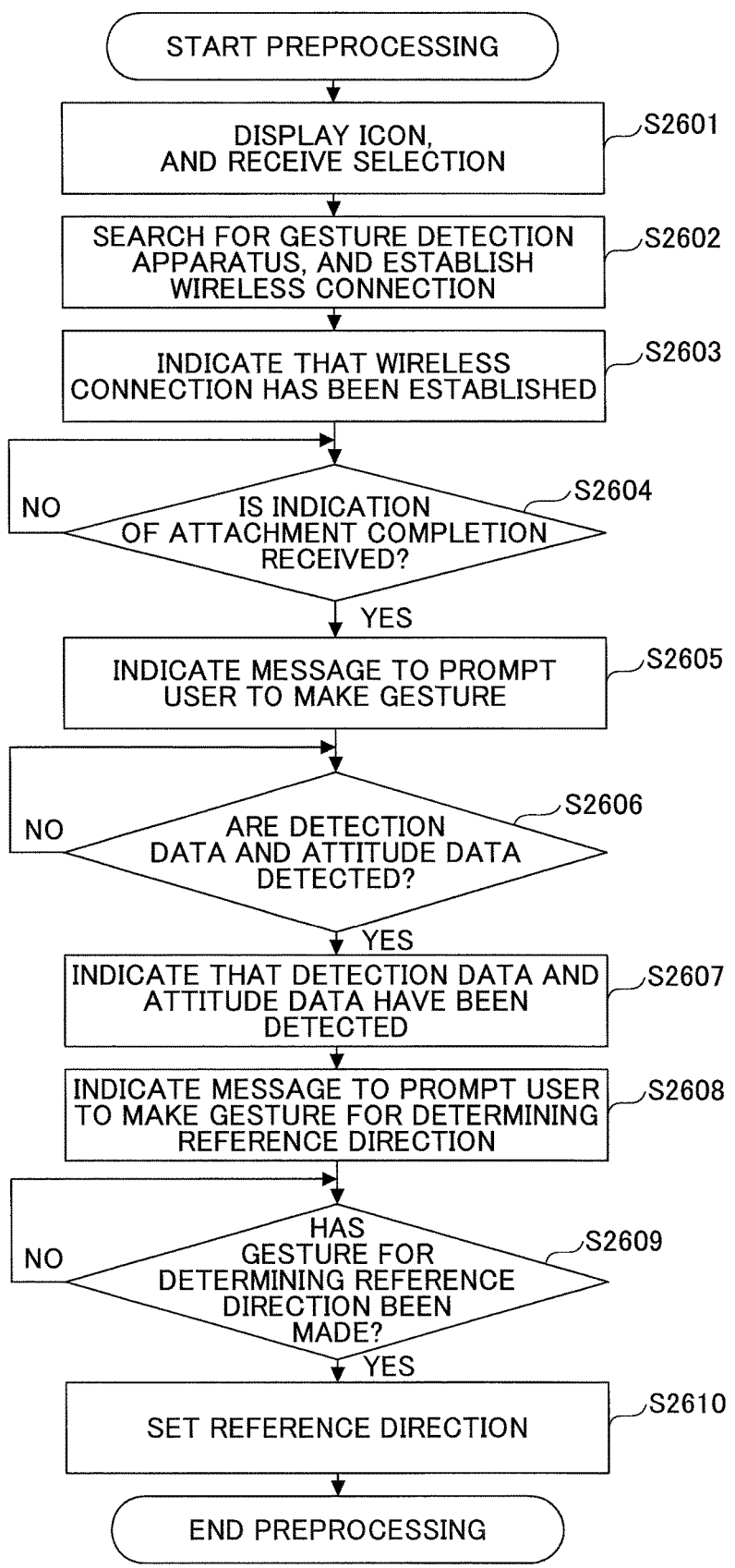
FIG. 26 is a flowchart of a preprocess.

FIG. 26 is a flowchart of a preprocess for the user to experience a performance of the imaginary drum set. Also, FIGS. 27A-27B are diagrams illustrating examples of a display screen 2700 of the mobile communication terminal 20 when executing the preprocess.

When the mobile communication terminal 20 is powered on, at Step S2601, the mobile communication terminal 20 displays an icon 2701 of a gesture detection application to have the user experience a performance of the imaginary drum set as illustrated in FIG. 27A. Also, when the user taps on the icon 2701 in response to the displayed icon 2701, the mobile communication terminal 20 receives it as input. Note that the gesture detection application to have a user experience a performance of the imaginary drum will be referred to as the "imaginary drum application" below.

Having received the tap on the icon 2701, the mobile communication terminal 20 makes a query whether to connect with the gesture detection apparatus 10 as illustrated in FIG. 27B. If the user taps on a button 2702 of "CONNECT", the mobile communication terminal 20 searches for the gesture detection apparatus 10 at Step S2602. After detecting the gesture detection apparatus 10, the mobile communication terminal 20 executes a process to make wireless connection with the gesture detection apparatus 10. Alternatively, if the user taps on a button 2703 of "DO NOT CONNECT" on the display screen illustrated in FIG. 27B, the mobile communication terminal 20 goes back to the display screen illustrated in FIG. 27A.

Having completed the process to make the wireless connection at Step S2602, the process goes forward to Step S2603 where the mobile communication terminal 20 makes an indication stating that the wireless connection has been established. Specifically, the mobile communication terminal 20 displays a message to prompt the user to attach the gesture detection apparatus 10 on the wrist on the display screen as illustrated in FIG. 27C.

At Step S2604, the mobile communication terminal 20 determines whether an indication of attachment completion is input by the user. Specifically, the mobile communication terminal 20 waits until "OK" button 2704 is tapped on the display screen illustrated in FIG. 27C, and when "OK" button 2704 is tapped, it determines an attachment completion is received as input, and the process goes forward to Step S2605. Note that if the "CANCEL" button 2705 is tapped by the user on the display screen illustrated in FIG. 27C, the mobile communication terminal 20 goes back to the display screen illustrated in FIG. 27A.

At Step S2605, the mobile communication terminal 20 indicates a message to prompt the user having the gesture detection apparatus 10 attached to make a gesture, to confirm whether detection data and attitude data can be appropriately transmitted from the gesture detection apparatus 10. The display screen illustrated in FIG. 27D is a display screen that displays a message to prompt the user having the gesture detection apparatus 10 attached to make a gesture.

Figure 27D:
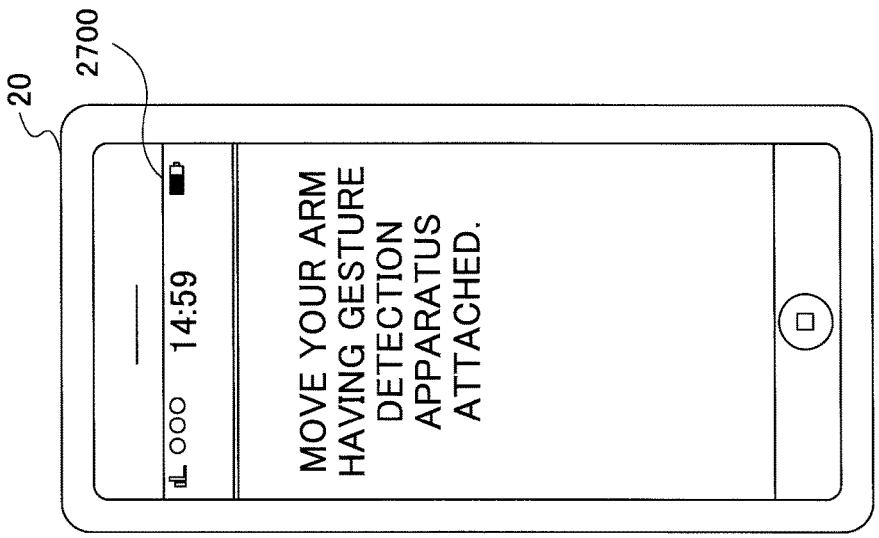
Figure 27C:
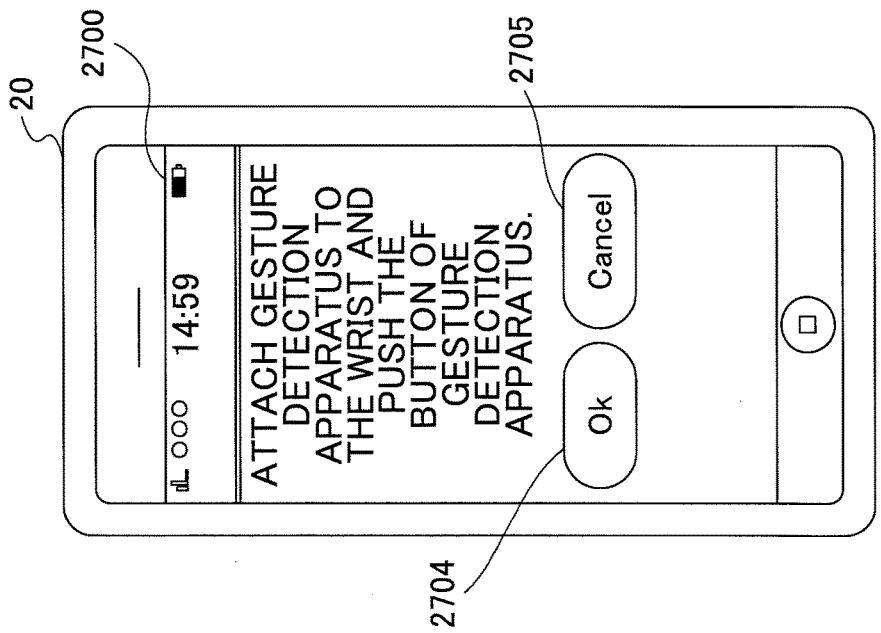

If the user makes a gesture, for example, moving the user's arm in response to the message displayed on the display screen in FIG. 27D, and the detection data and attitude data are transmitted from the gesture detection apparatus 10, the mobile communication terminal 20 receives the data.

Having received the detection data and attitude data, at Step S2606, the mobile communication terminal 20 determines that the detection data and attitude data are detected, and the process goes forward to Step S2607. At Step S2607, the mobile communication terminal 20 indicates that the detection data and attitude data are detected, and at Step S2608, indicates a message to prompt the user to make a gesture for determining a reference direction. Specifically, the mobile communication terminal 20 displays a display screen illustrated in FIG. 27E.

Here, the reference direction is a rotation angle around the Z-axis used as a reference. As described above, the relative attitude data calculation unit 2302 converts attitude data obtained at the attitude data obtainment unit 2301 into the relative attitude data (relative angle) Q relative to the reference direction. The mobile communication terminal 20 obtains the reference direction, which is required for calculation of the relative attitude data Q, while executing the preprocess.

Note that the imaginary drum application is a gesture detection application for experiencing a performance of the imaginary drum set. Therefore, to obtain the reference direction, the imaginary drum application prompt the user to make a gesture moving the arm while having an image of beating the floor tam 2513 in mind. FIGS. 28A-28C are diagrams illustrating the process to determine the reference direction.

As illustrated in FIGS. 28A-28B, while sitting on a chair, the user swings his/her arm having the gesture detection apparatus 10 attached downward in a direction designated by an arrow 2801 while having an image of beating the floor tam 2513 in mind. By obtaining detection data having a predetermined amplitude, the mobile communication terminal 20 determines that the user has made a gesture for determining the reference direction.

Then, a direction of a line on which a plane formed by the trajectory 2802 (FIG. 28C) of the downward swing crosses the X-Y plane is set as the reference direction. In the following, the relative attitude data calculation unit 2302 calculates the difference between the attitude data obtained by the attitude data obtainment unit 2301 and the attitude data ($Q_{std}$) representing the reference direction (relative angle) as the relative attitude data Q.

Figure 29A:
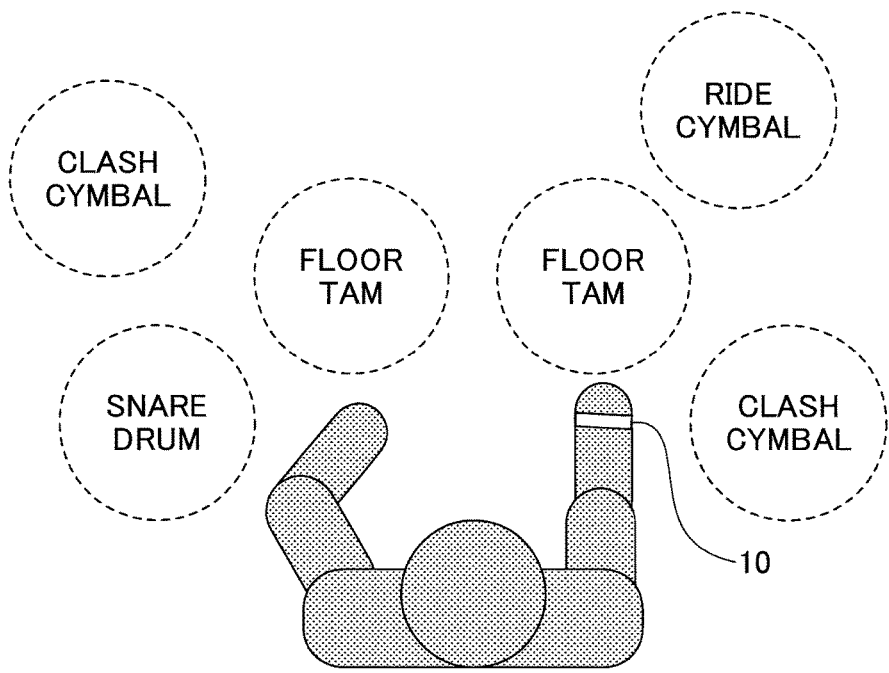
FIGS. 29A-29C are diagrams illustrating different positions of percussion instruments due to different reference directions.
Figure 29B:
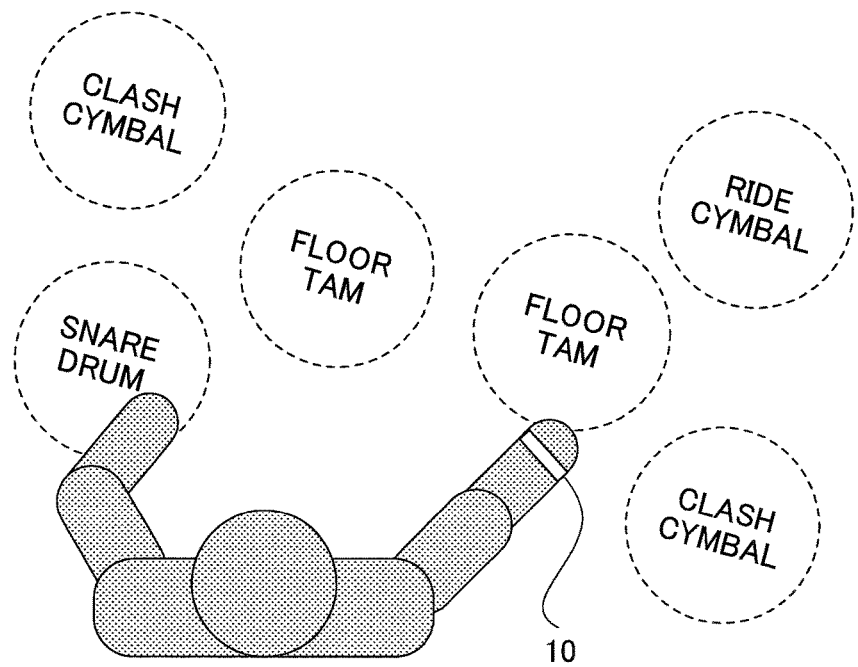
Figure 29C:
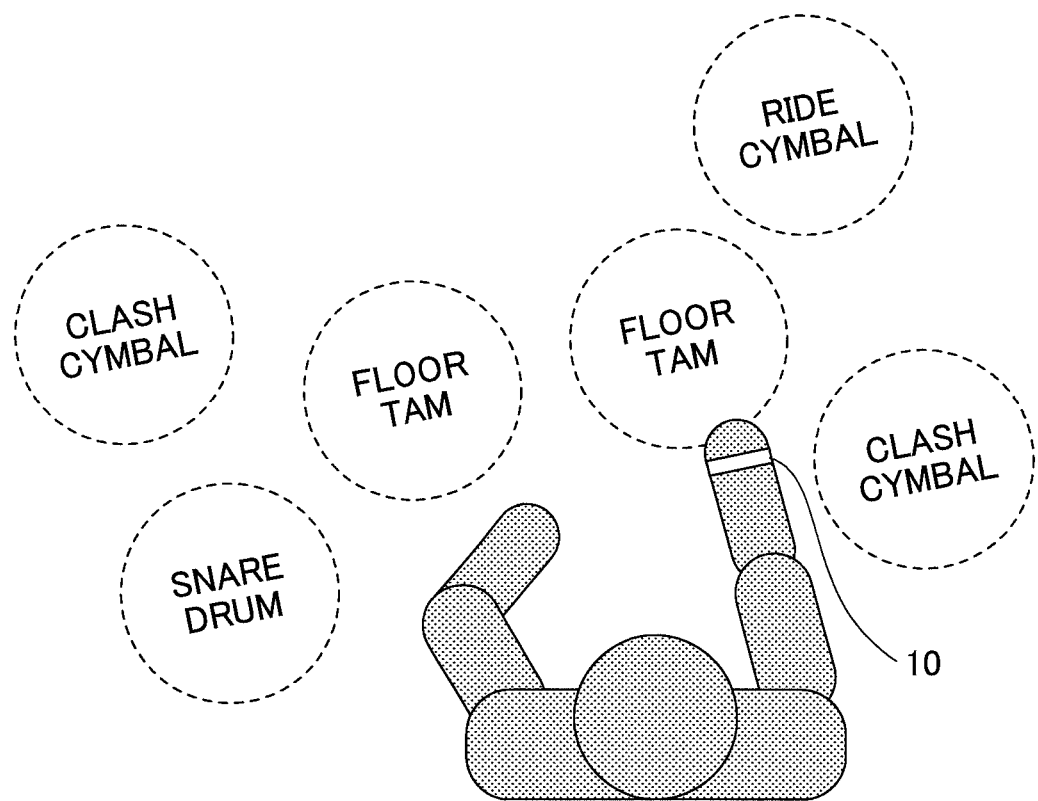

In this way, the reference direction is determined based on the attitude data ($Q_{std}$) taken when the user swings his/her arm while having an image of beating the floor tam 2513 in mind. Therefore, the user can set the respective percussion instruments constituting the drum set at favorable positions. FIGS. 29A-29C are diagrams illustrating different positions of the percussion instruments due to different reference directions. FIG. 29A illustrates a state where the user sets the reference direction so that the floor tam 2513 is positioned in the front direction of the user. On the other hand, FIG. 29B illustrates a state where the user sets the reference direction so that the floor tam 2513 is positioned a bit rightward relative to the front direction of the user. Also, FIG. 29C illustrates a state where the user sets the reference direction so that the floor tam 2513 is positioned a bit leftward relative to the front direction of the user.

Referring to FIG. 26 again, at Step S2609, the mobile communication terminal 20 determines whether a gesture has been made for determining the reference direction, and if determining that a gesture has not been made, waits until it is made.

On the other hand, at Step S2609, if determining that a gesture has been made, the process goes forward to Step S2610. At Step S2610, the mobile communication terminal 20 sets the reference direction based on the attitude data ($Q_{std}$) obtained when the gesture was made for determining the reference direction.

Figure 27F:
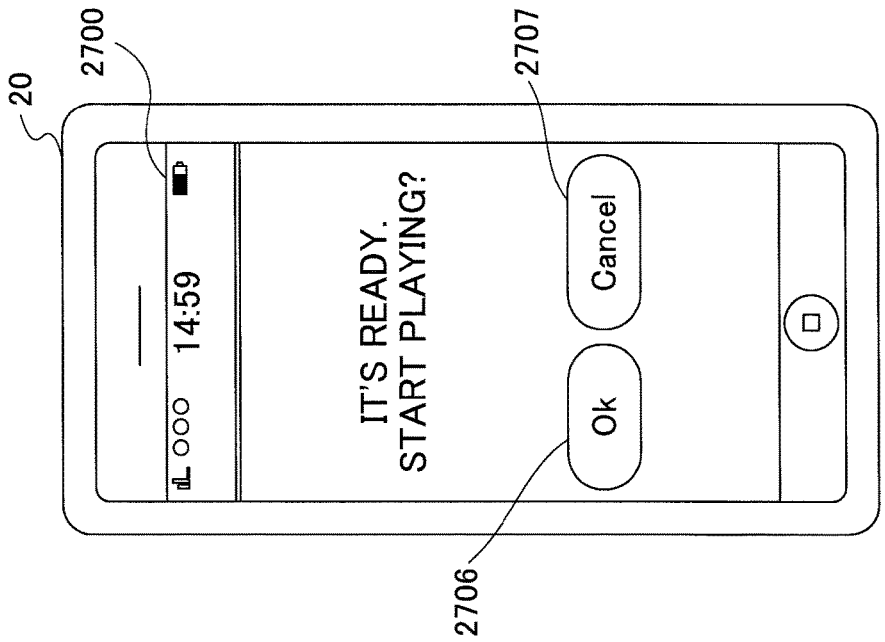
Figure 27E:
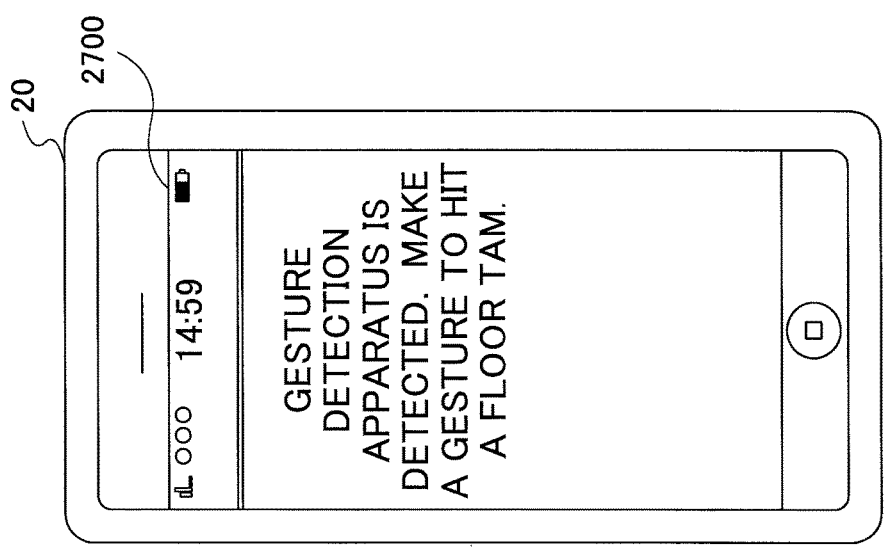

Having completed the setting of the reference direction, the mobile communication terminal 20 displays a message to prompt the user to start experiencing a performance of the imaginary drum set as illustrated in FIG. 27F. If the "OK" button 2706 is tapped on the display screen illustrated in FIG. 27F, the preprocess ends, and a performance process starts as will be described below. On the other hand, if the "CANCEL" button 2707 is tapped by the user, the preprocess ends, the mobile communication terminal 20 goes back to the display screen illustrated in FIG. 27A.

<<5. Application Example>>
<<Performance Process>>

Figure 30:
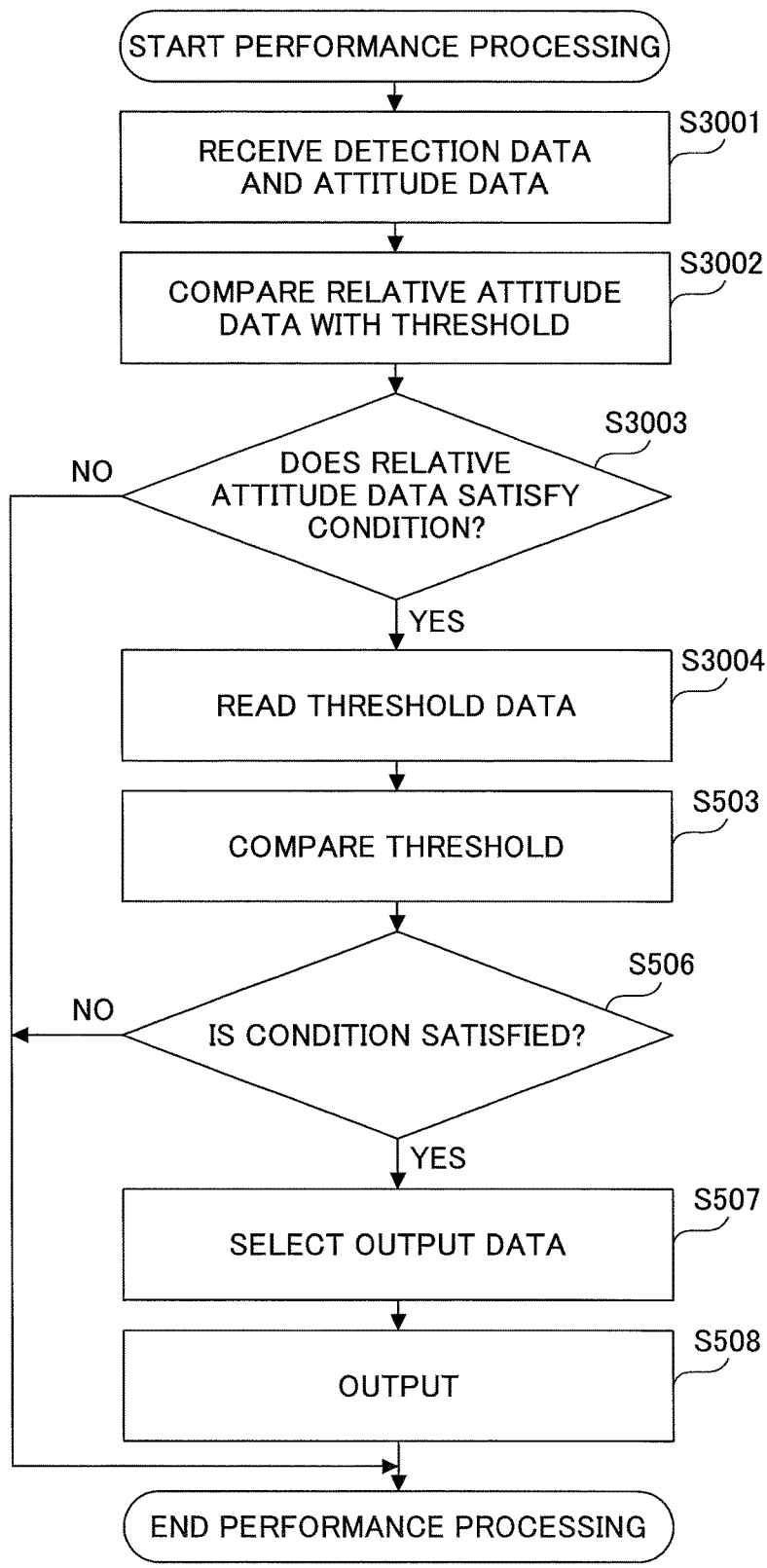
FIG. 30 is a flowchart of a performance process.

Next, the performance process will be described. FIG. 30 is a flowchart of a performance process to have a user experience a performance of the imaginary drum set.

When the performance process starts, at Step S3001, the detection data obtainment unit 251 starts obtaining detection data from the gesture detection apparatus 10. Also, the attitude data obtainment unit 2301 starts obtaining attitude data from the gesture detection apparatus 10.

At Step S3002, the relative attitude data calculation unit 2302 calculates the relative attitude data (relative angle) Q by calculating the difference between the attitude data obtained by the attitude data obtainment unit 2301 and the reference direction. Furthermore, the threshold data read unit 2304 reads the thresholds Q0 to Q7 specified as the "condition of relative attitude data" in the association data 2221.

At Step S3003, the threshold comparison unit 2303 compares the relative attitude data Q calculated by the relative attitude data calculation unit 2302 with the thresholds Q0 to Q7 read at Step S3002. In this way, it determines whether the calculated relative attitude data Q satisfies one of the conditions specified in the "condition of relative attitude data".

At Step S3004, the registered waveform data read unit 252 reads the thresholds A, B, and C registered in the association data 2221 that correspond to the conditions (condition of relative attitude data) determined at Step S3003. The rest of the process, or Steps S503, S506 to S508, are the same as Steps S503, S506 to S508 in FIG. 17, and their description is omitted here.

In this way, the mobile communication terminal 20 periodically reads detection data and attitude data during the performance process, to determine user's gestures and the operational directions. This makes it possible for the mobile communication terminal 20 to determine whether a user moves his/her arm while having an image of beating one of the percussion instruments constituting the drum set in mind, and to output the sound supposed to be generated when the corresponding percussion instrument is beaten.

Figure 31A:
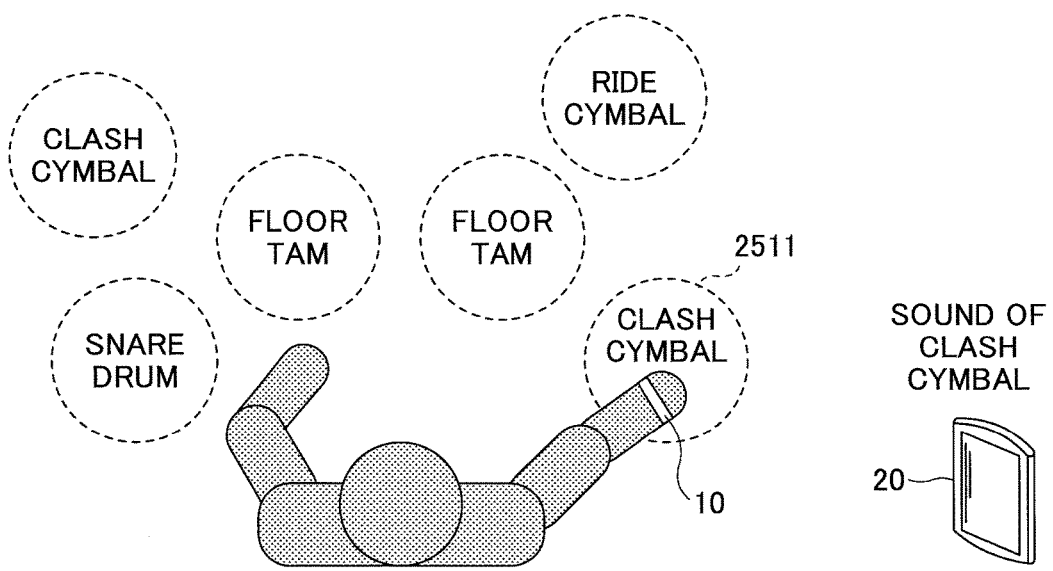
FIGS. 31A-31C are diagrams illustrating relationships between a user in a performance process and output from a mobile communication terminal.
Figure 31B:
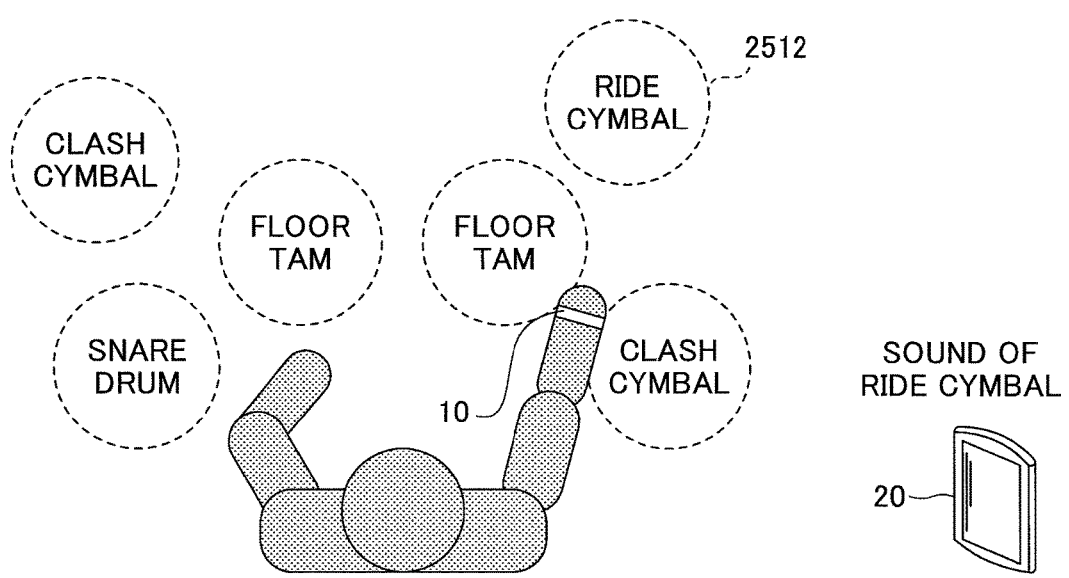
Figure 31C:
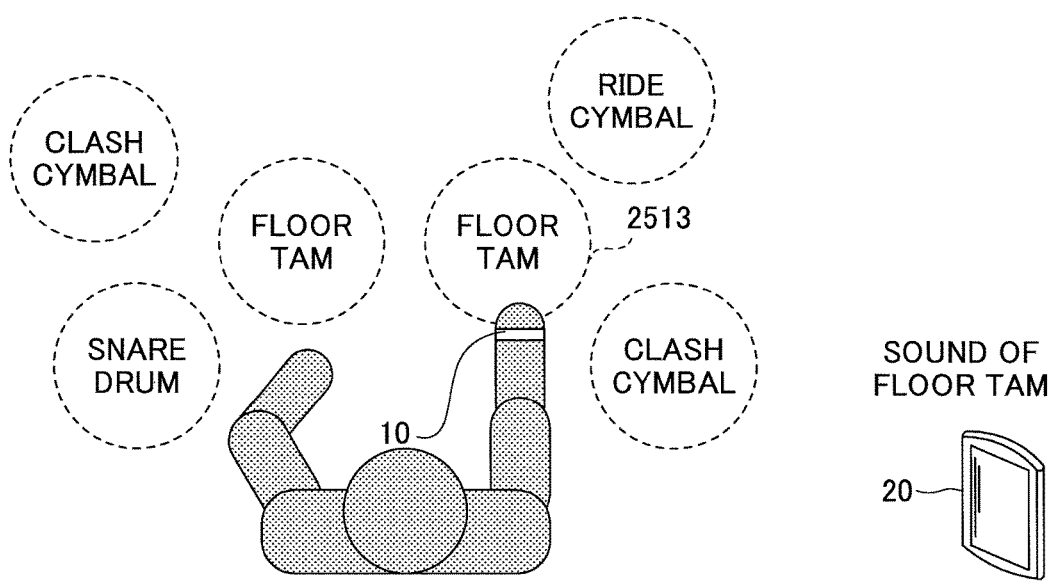

FIGS. 31A-31C are diagrams illustrating relationships between a user in a performance process and output from the mobile communication terminal 20. FIG. 31A illustrates a state where the user, having an image of beating the clash cymbal 2511 in mind, makes a gesture of beating the clash cymbal 2511 in the direction where the clash cymbal 2511 is supposed to be placed. In this case, the mobile communication terminal 20 outputs the sound of the clash cymbal 2511 at the timing when the user makes the gesture of beating the clash cymbal 2511 with a volume corresponding to the beat strength.

Similarly, FIG. 31B illustrates a state where the user, having an image of beating the ride cymbal 2512 in mind, makes a gesture of beating the ride cymbal 2512 in the direction where the ride cymbal 2512 is supposed to be placed. In this case, the mobile communication terminal 20 outputs the sound of the ride cymbal 2512 at the timing when the user makes the gesture of beating the ride cymbal 2512 with a volume corresponding to the beat strength.

Furthermore, FIG. 31C illustrates a state where the user, having an image of beating the floor tam 2513 in mind, makes a gesture of beating the floor tam 2513 in the direction where the floor tam 2513 is supposed to be placed. In this case, the mobile communication terminal 20 outputs the sound of the floor tam 2513 at the timing when the user makes the gesture of beating the floor tam 2513 with a volume corresponding to the beat strength.

In this way, according to the second embodiment, it is possible to implement a function of performing an imaginary drum set by having a configuration where the direction (operational direction) of a user's gesture is identified in addition to the type of a user's gesture, to switch audio or visual data to be output.

[Third Embodiment]

According to the first and second embodiments, configurations are adopted where acceleration data and the like are used for identifying the type of a user's gesture and/or the direction of the user's gesture, but the present invention is not limited to those configurations. For example, a configuration may be adopted where an air pressure sensor or the like is used for identifying the height at which a user's gesture is performed.

Also, in the first and second embodiments, although cases are described where the user has the gesture detection apparatus 10 attached on one of the user's wrists, the user may have the gesture detection apparatuses 10 attached on both of the user's wrists. In this case, the respective gesture detection apparatuses 10 attached on the wrists, and the mobile communication terminal 20 communicating with the respective gesture detection apparatuses 10 attached on the wrists, independently execute the processes described in the first and second embodiments, respectively.

Note that if the user has the gesture detection apparatuses 10 attached on both of his/her wrists, a configuration may be adopted where a part of the processes described in the first and second embodiments are shared for execution. For example, the steps to determine the reference direction may be executed one of the gesture detection apparatuses 10 attached to one of the wrists. And the reference direction that has been already set may be used when calculating the relative attitude data based on attitude data output from the other gesture detection apparatus 10 attached to the corresponding wrist.

Also, the second embodiment is described for a case where the gesture detection system 1 is used for an imaginary drum set, applications of the gesture detection system 1 is not limited to the imaginary drum set, but it can be applied to different sets of percussion instruments, or instruments other than percussion instruments.

This application is based upon and claims the benefit of priority of the prior Japanese Priority Application No. 2013-229032 filed on Nov. 5, 2013, and the prior Japanese Priority Application No. 2014-206748 filed on Oct. 7, 2014, the entire contents of which are hereby incorporated by reference.

What is claimed is:

1. A gesture detection system including a gesture detection apparatus for detecting a gesture, and a mobile communication terminal for communicating with the gesture detection apparatus,
    wherein the gesture detection apparatus includes
    a sensor configured to detect acceleration data in an X-axis direction, acceleration data in a Y-axis direction, and acceleration data in a Z-axis direction; and
    a transmitter configured to transmit, to the mobile communication terminal, detection data including the acceleration data in the X-axis direction, the acceleration data in the Y-axis direction, and the acceleration data in the Z-axis direction, wherein the acceleration data in the X-axis direction, the acceleration data in the Y-axis direction, and the acceleration data in the Z-axis direction are detected by the sensor,
    wherein the mobile communication terminal includes
    a receiver configured to receive the detection data transmitted by the transmitter of the gesture detection apparatus;
    an output unit configured to output audio and/or video based on output data;
    a storage unit configured to store threshold data, a flag value, association data, and the output data; and
    a processor;
    wherein the threshold data includes a threshold value in the X-axis direction, a threshold value in the Y-axis direction, and a threshold value in the Z-axis direction,
    wherein the flag value takes one of binary values,
    wherein the output data includes a plurality of output data patterns for the audio and/or the video,
    wherein the association data includes a table that defines one-to-one correspondence between a plurality of combinations and the plurality of output data patterns, each of the plurality of combinations being a combination of a threshold condition, which corresponds to a particular gesture among a plurality of stored gestures, and the flag value, wherein each threshold condition is determined by relation between an acceleration value in the X-axis direction and the threshold value in the X-axis direction, relation between an acceleration value in the Y-axis direction and the threshold value in the Y-axis direction, and relation between an acceleration value in the Z-axis direction and the threshold value in the Z-axis direction,
    wherein the processor detects one threshold condition of the plurality of threshold conditions by comparing a maximum value of the acceleration data in the X-axis direction with the threshold value in the X-axis direction, comparing a maximum value of the acceleration data in the Y-axis direction with the threshold value in the Y-axis direction, and comparing a maximum value of the acceleration data in the Z-axis direction with the threshold value in the Z-axis direction,
    wherein the processor retrieves the flag value stored in the storage unit,
    wherein the processor selects, from the plurality of output data patterns, one output data pattern corresponding to a combination of the one threshold condition and the flag value,
    wherein the processor causes the output unit to output the audio and/or the video based on the selected one output data pattern, and
    wherein, after the output unit outputs the audio and/or the video, upon detecting that the one threshold condition is a predetermined threshold condition with a predetermined combination of threshold conditions in the X-axis, Y-axis and Z-axis corresponding to a predetermined gesture, the processor updates the flag value with the other one of the binary values.

2. The gesture detection system according to claim 1, wherein the gesture detection apparatus includes
    a housing, and
    a belt attached to the housing on two opposite side surfaces of the housing.

3. The gesture detection system according to claim 2, wherein the gesture detection apparatus is attached to a toy operated by a user, or a wrist of the user, by the belt.

4. A gesture detection apparatus attached to a toy operated by a user, or a wrist of the user, the gesture detection apparatus comprising:
    a sensor configured to detect acceleration data in an X-axis direction, acceleration data in a Y-axis direction, and acceleration data in a Z-axis direction; and
    a transmitter configured to transmit, to a mobile communication terminal, detection data including the acceleration data in the X-axis direction, the acceleration data in the Y-axis direction, and the acceleration data in the Z-axis direction, wherein the acceleration data in the X-axis direction, the acceleration data in the Y-axis direction, and the acceleration data in the Z-axis direction are detected by the sensor,
    wherein the mobile communication terminal includes
    a receiver configured to receive the detection data transmitted by the transmitter of the gesture detection apparatus;
    an output unit configured to output audio and/or video based on output data;
    a storage unit configured to store threshold data, a flag value, association data, and the output data; and
    a processor,
    wherein the threshold data includes a threshold value in the X-axis direction, a threshold value in the Y-axis direction, and a threshold value in the Z-axis direction,
    wherein the flag value takes one of binary values,
    wherein the output data includes a plurality of output data patterns for the audio and/or the video,
    wherein the association data includes a table that defines one-to-one correspondence between a plurality of combinations and the plurality of output data patterns, each of the plurality of combinations being a combination of a threshold condition, which corresponds to a particular gesture among a plurality of stored gestures, and the flag value, wherein each threshold condition is determined by relation between an acceleration value in the X-axis direction and the threshold value in the X-axis direction, relation between an acceleration value in the Y-axis direction and the threshold value in the Y-axis direction, and relation between an acceleration value in the Z-axis direction and the threshold value in the Z-axis direction, wherein the processor detects one threshold condition of the plurality of threshold conditions by comparing a maximum value of the acceleration data in the X-axis direction with the threshold value in the X-axis direction, comparing a maximum value of the acceleration data in the Y-axis direction with the threshold value in the Y-axis direction, and comparing a maximum value of the acceleration data in the Z-axis direction with the threshold value in the Z-axis direction, wherein the processor retrieves the flag value stored in the storage unit, wherein the processor selects, from the plurality of output data patterns, one output data pattern corresponding to a combination of the one threshold condition and the flag value, wherein the processor causes the output unit to output the audio and/or the video based on the selected one output data pattern, and wherein, after the output unit outputs the audio and/or the video, upon detecting that the one threshold condition is a predetermined threshold condition with a predetermined combination of threshold conditions in the X-axis, Y-axis and Z-axis corresponding to a predetermined gesture, the processor updates the flag value with the other one of the binary values.

5. A mobile communication terminal for communicating with a gesture detection apparatus for detecting a gesture, the mobile communication terminal comprising:

a receiver configured to receive detection data transmitted by the gesture detection apparatus, wherein the detection data includes acceleration data in an X-axis direction, acceleration data in a Y-axis direction, and acceleration data in a Z-axis direction, wherein the acceleration data in the X-axis direction, the acceleration data in the Y-axis direction, and the acceleration data in the Z-axis direction are detected by the gesture detection apparatus;

an output unit configured to output audio and/or video based on output data;

a storage unit configured to store threshold data, a flag value, association data, and the output data; and a processor, wherein the threshold data includes a threshold value in the X-axis direction, a threshold value in the Y-axis direction, and a threshold value in the Z-axis direction, wherein the flag value takes one of binary values, wherein the output data includes a plurality of output data patterns for the audio and/or the video, wherein the association data includes a table that defines one-to-one correspondence between a plurality of combinations and the plurality of output data patterns, each of the plurality of combinations being a combination of a threshold condition, which corresponds to a particular gesture among a plurality of stored gestures, and the flag value, wherein each threshold condition is determined by relation between an acceleration value in the X-axis direction and the threshold value in the X-axis direction, relation between an acceleration value in the Y-axis direction and the threshold value in the Y-axis direction, and relation between an acceleration value in the Z-axis direction and the threshold value in the Z-axis direction, wherein the processor detects one threshold condition of the plurality of threshold conditions by comparing a maximum value of the acceleration data in the X-axis direction with the threshold value in the X-axis direction, comparing a maximum value of the acceleration data in the Y-axis direction with the threshold value in the Y-axis direction, and comparing a maximum value of the acceleration data in the Z-axis direction with the threshold value in the Z-axis direction, wherein the processor retrieves the flag value stored in the storage unit, wherein the processor selects, from the plurality of output data patterns, one output data pattern corresponding to a combination of the one threshold condition and the flag value, wherein the processor causes the output unit to output the audio and/or the video based on the selected one output data pattern, and wherein, after the output unit outputs the audio and/or the video, upon detecting that the one threshold condition is a predetermined threshold condition with a predetermined combination of threshold conditions in the X-axis, Y-axis and Z-axis corresponding to a predetermined gesture, the processor updates the flag value with the other one of the binary values.

6. A non-transitory computer-readable recording medium storing a program executed by a computer for communicating with a gesture detection apparatus for detecting a gesture, wherein the computer comprises:

a receiver configured to receive detection data transmitted by the gesture detection apparatus, wherein the detection data includes acceleration data in an X-axis direction, acceleration data in a Y-axis direction, and acceleration data in a Z-axis direction, wherein the acceleration data in the X-axis direction, the acceleration data in the Y-axis direction, and the acceleration data in the Z-axis direction are detected by the gesture detection apparatus;

an output unit configured to output audio and/or video based on output data;

a storage unit configured to store threshold data, a flag value, association data, and the output data; and a processor, wherein the threshold data includes a threshold value in the X-axis direction, a threshold value in the Y-axis direction, and a threshold value in the Z-axis direction, wherein the flag value takes one of binary values, wherein the output data includes a plurality of output data patterns for the audio and/or the video, wherein the association data includes a table that defines one-to-one correspondence between a plurality of combinations and the plurality of output data patterns, each of the plurality of combinations being a combination of a threshold condition, which corresponds to a particular gesture among a plurality of stored gestures, and the flag value, wherein each threshold condition is determined by relation between an acceleration value in the X-axis direction and the threshold value in the X-axis direction, relation between an acceleration value in the Y-axis direction and the threshold value in the Y-axis direction, and relation between an acceleration value in the Z-axis direction and the threshold value in the Z-axis direction, wherein, when the program is executed by the computer, the program causes the processor of the computer to execute a process including:

detecting one threshold condition of the plurality of threshold conditions by comparing a maximum value of the acceleration data in the X-axis direction with the threshold value in the X-axis direction, comparing a maximum value of the acceleration data in the Y-axis direction with the threshold value in the Y-axis direction, and comparing a maximum value of the acceleration data in the Z-axis direction with the threshold value in the Z-axis direction;

retrieving the flag value stored in the storage unit;

selecting, from the plurality of output data patterns, one output data pattern corresponding to a combination of the one threshold condition and the flag value, causing the output unit to output the audio and/or the video based on the selected one output data pattern; and after the output unit outputs the audio and/or the video, upon detecting that the one threshold condition is a predetermined threshold condition with a predetermined combination of threshold conditions in the X-axis, Y-axis and Z-axis corresponding to a predetermined gesture, updating the flag value with the other one of the binary values.

7. A gesture detection system including a gesture detection apparatus for detecting a gesture, and a mobile communication terminal for communicating with the gesture detection apparatus, wherein the gesture detection apparatus includes a sensor configured to detect acceleration data in an X-axis direction, acceleration data in a Y-axis direction, and acceleration data in a Z-axis direction;

a calculation unit configured to calculate a relative angle of the gesture detection apparatus around the Z-axis, wherein the relative angle is an angle between a direction of the gesture detection apparatus and a calculated reference direction; and a transmitter configured to transmit, to the mobile communication terminal, posture data including the acceleration data in the X-axis direction, the acceleration data in the Y-axis direction, the acceleration data in the Z-axis direction, and the relative angle, wherein the acceleration data in the X-axis direction, the acceleration data in the Y-axis direction, and the acceleration data in the Z-axis direction are detected by the sensor, and the relative angle is calculated by the calculation unit, wherein the mobile communication terminal includes a receiver configured to receive the posture data transmitted by the transmitter of the gesture detection apparatus;

an output unit configured to output audio and/or video based on output data;

a storage unit configured to store threshold data, association data, and the output data; and a processor, wherein the threshold data includes a threshold value in the X-axis direction, a threshold value in the Y-axis direction, a threshold value in the Z-axis direction, and a plurality of threshold values with respect to an angle around the Z-axis, wherein the output data includes a plurality of output data patterns for the audio and/or the video, wherein the association data includes a table that defines one-to-one correspondence between a plurality of threshold conditions and the plurality of output data patterns, wherein each of the plurality of threshold conditions, which corresponds to a particular gesture among a plurality of stored gestures, is determined by relation between an acceleration value in the X-axis direction and the threshold value in the X-axis direction, relation between an acceleration value in the Y-axis direction and the threshold value in the Y-axis direction, relation between an acceleration value in the Z-axis direction and the threshold value in the Z-axis direction, and relation between the angle around the Z-axis and the plurality of threshold values with respect to the angle around the Z-axis, wherein the storage unit further stores a plurality of operational directions in which a plurality of percussion instruments in a set are respectively placed with respect to the calculated reference direction, one of the plurality of threshold conditions corresponds to a gesture of beating a percussion instrument in the set, wherein the reference direction is calculated based on the posture data detected by the gesture detection apparatus corresponding to a gesture of beating a predetermined one of the percussion instruments in the set, wherein the processor detects said one of the plurality threshold conditions by comparing a maximum value of the acceleration data in the X-axis direction with the threshold value in the X-axis direction, comparing a maximum value of the acceleration data in the Y-axis direction with the threshold value in the Y-axis direction, comparing a maximum value of the acceleration data in the Z-axis direction with the threshold value in the Z-axis direction, and comparing the relative angle calculated by the calculation unit and the plurality of threshold values with respect to the angle around the Z-axis, wherein the processor selects, from the plurality of output data patterns, one output data pattern corresponding to said one of the threshold conditions, and wherein the processor causes the output unit to output the audio and/or the video based on the selected one output data pattern.

8. The gesture detection system according to claim 7, wherein the storage unit stores audio data to be generated when the gesture of beating one of the percussion instruments is performed, the audio data being associated with the gesture and the plurality of operational directions.

9. A non-transitory computer-readable recording medium storing a program executed by a computer for communicating with a gesture detection apparatus, wherein the computer includes a receiver configured to receive posture data transmitted by the gesture detection apparatus, the posture data including acceleration data in an X-axis direction, acceleration data in a Y-axis direction, acceleration data in a Z-axis direction, and a relative angle of the gesture detection apparatus around the Z-axis, wherein the acceleration data in the X-axis direction, the acceleration data in the Y-axis direction, the acceleration data in the Z-axis direction are detected by the gesture detection apparatus, and the relative angle is an angle between a direction of the gesture detection apparatus and a calculated reference direction;

an output unit configured to output audio and/or video based on output data;

a storage unit configured to store threshold data, association data, and the output data; and a processor, wherein the threshold data includes a threshold value in the X-axis direction, a threshold value in the Y-axis direction, a threshold value in the Z-axis direction, and a plurality of threshold values with respect to an angle around the Z-axis, wherein the output data includes a plurality of output data patterns for the audio and/or the video, wherein the association data includes a table that defines one-to-one correspondence between a plurality of threshold conditions and the plurality of output data patterns, wherein each of the plurality of threshold conditions, which corresponds to a particular gesture among a plurality of stored gestures, is determined by relation between an acceleration value in the X-axis direction and the threshold value in the X-axis direction, relation between an acceleration value in the Y-axis direction and the threshold value in the Y-axis direction, relation between an acceleration value in the Z-axis direction and the threshold value in the Z-axis direction, and relation between the angle around the Z-axis and the plurality of threshold values with respect to the angle around the Z-axis, wherein the storage unit further stores a plurality of operational directions in which a plurality of percussion instruments in a set are respectively placed with respect to the calculated reference direction, one of the plurality of threshold conditions corresponds to a gesture of beating a percussion instrument in the set, wherein the reference direction is calculated based on the posture data detected by the gesture detection apparatus corresponding to a gesture of beating a predetermined one of the percussion instruments in the set, wherein, when the program is executed by the computer, the program causes the processor of the computer to execute a process including:

detecting said one of the plurality threshold conditions by comparing a maximum value of the acceleration data in the X-axis direction with the threshold value in the X-axis direction, comparing a maximum value of the acceleration data in the Y-axis direction with the threshold value in the Y-axis direction, comparing a maximum value of the acceleration data in the Z-axis direction with the threshold value in the Z-axis direction, and comparing the relative angle and the plurality of threshold values with respect to the angle around the Z-axis, selecting, from the plurality of output data patterns, one output data pattern corresponding to said one of the threshold conditions, and causing the output unit to output the audio and/or the video based on the selected one output data pattern.

* * * * *